United States Patent
Hu et al.

(10) Patent No.: US 11,041,759 B2
(45) Date of Patent: Jun. 22, 2021

(54) SYSTEMS AND METHODS FOR RAMAN SPECTROSCOPY

(71) Applicant: Massachusetts Institute of Technology, Cambridge, MA (US)

(72) Inventors: Juejun Hu, Newton, MA (US); Derek Kita, Cambridge, MA (US); Jerome Michon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/456,188

(22) Filed: Jun. 28, 2019

(65) Prior Publication Data

US 2020/0003619 A1    Jan. 2, 2020

Related U.S. Application Data

(60) Provisional application No. 62/691,073, filed on Jun. 28, 2018.

(51) Int. Cl.
*G01J 3/44* (2006.01)
*G01J 3/02* (2006.01)
*G01J 3/10* (2006.01)
*G01N 21/65* (2006.01)

(52) U.S. Cl.
CPC .......... *G01J 3/4406* (2013.01); *G01J 3/0205* (2013.01); *G01J 3/0218* (2013.01); *G01J 3/10* (2013.01); *G01N 21/65* (2013.01)

(58) Field of Classification Search
CPC ...... G01J 3/4406; G01J 3/0205; G01J 3/0218; G01J 3/10; G01N 21/65; G02B 21/02
See application file for complete search history.

(56) References Cited

U.S. PATENT DOCUMENTS

| | | |
|---|---|---|
| D262,419 S | 12/1981 | Cramer |
| 4,749,248 A | 6/1988 | Aberson, Jr. et al. |
| 4,969,742 A | 11/1990 | Falk et al. |
| 5,044,715 A | 9/1991 | Kawachi et al. |
| 5,546,181 A | 8/1996 | Kobayashi et al. |

(Continued)

FOREIGN PATENT DOCUMENTS

| | | |
|---|---|---|
| WO | 2012097982 A1 | 7/2012 |
| WO | 2013188520 A2 | 12/2013 |
| WO | 2014190331 A3 | 3/2015 |

OTHER PUBLICATIONS

International Search Report and Written Opinion in International Patent Application No. PCT/US2019/065689 dated Feb. 27, 2020, 10 pages.

(Continued)

*Primary Examiner* — Jamil Ahmed
(74) *Attorney, Agent, or Firm* — Smith Baluch LLP

(57) ABSTRACT

A method of performing Raman spectroscopy can include guiding a Raman pump beam with an optical fiber, where the Raman pump beam inducing fluorescence in the optical fiber. The beam and the fluorescence are coupled to a photonic integrated circuit (PIC) via the fiber. The beam is used to excite a sample in optical communication with the PIC via evanescent coupling and induces Raman scattering in the sample. The Raman scattering is collected via the PIC, and the Raman pump beam as well as the fluorescence is filtered out from the Raman scattering via the PIC.

16 Claims, 7 Drawing Sheets

(56) References Cited

U.S. PATENT DOCUMENTS

| | | |
|---|---|---|
| 5,644,125 A | 7/1997 | Wobschall |
| 5,751,415 A | 5/1998 | Smith et al. |
| 5,814,565 A | 9/1998 | Reichert et al. |
| 6,108,478 A | 8/2000 | Harpin et al. |
| 6,205,279 B1 | 3/2001 | Kim et al. |
| 6,370,422 B1 | 4/2002 | Richards-Kortum et al. |
| 6,925,220 B2 | 8/2005 | Mukai |
| 6,947,631 B2 | 9/2005 | Arai et al. |
| 6,963,062 B2 | 11/2005 | Cyr et al. |
| 6,975,781 B2 | 12/2005 | Takiguchi et al. |
| 7,151,599 B2 | 12/2006 | Islam et al. |
| 7,251,406 B2 | 7/2007 | Luo et al. |
| 7,301,624 B2 | 11/2007 | Talley et al. |
| 7,359,593 B2 | 4/2008 | Little |
| 7,361,501 B2 | 4/2008 | Koo et al. |
| 7,400,798 B2 | 7/2008 | De Almeida et al. |
| 7,547,904 B2 | 6/2009 | Schmidt et al. |
| 7,636,157 B2 | 12/2009 | Wang et al. |
| 7,864,321 B2 | 1/2011 | Caron et al. |
| 8,098,379 B2 | 1/2012 | Okamoto |
| 8,116,602 B2 | 2/2012 | Little et al. |
| 8,121,450 B2 | 2/2012 | Webster et al. |
| 8,297,128 B2 | 10/2012 | Delbos et al. |
| D677,185 S | 3/2013 | Zhou et al. |
| 8,406,580 B2 | 3/2013 | Takada et al. |
| 8,545,759 B2 | 10/2013 | Niazi |
| 8,615,324 B2 | 12/2013 | West |
| 8,640,560 B2 | 2/2014 | Burke |
| 8,718,981 B2 | 5/2014 | Bey et al. |
| 8,809,765 B2 | 8/2014 | Weisshaar et al. |
| 8,971,672 B2 | 3/2015 | Diemeer et al. |
| D748,510 S | 2/2016 | Zhou et al. |
| 9,529,158 B2 | 12/2016 | Sorger et al. |
| 9,618,699 B2 | 4/2017 | Tummidi et al. |
| 9,816,935 B2 | 11/2017 | Peumans et al. |
| 10,006,809 B2 | 6/2018 | Hu et al. |
| 10,054,546 B2 | 8/2018 | Stievater et al. |
| 10,240,980 B2 | 3/2019 | Hu et al. |
| 10,386,237 B2 | 8/2019 | Hu et al. |
| 10,571,335 B2 | 2/2020 | Hu et al. |
| 10,610,087 B2 | 4/2020 | Hu et al. |
| 10,718,668 B2 | 7/2020 | Gu et al. |
| 10,852,190 B2 | 12/2020 | Hu et al. |
| 2002/0159684 A1 | 10/2002 | Sun et al. |
| 2003/0048991 A1 | 3/2003 | Gonthier |
| 2003/0156786 A1 | 8/2003 | Pan |
| 2004/0001671 A1 | 1/2004 | Liu et al. |
| 2004/0131310 A1 | 7/2004 | Walker |
| 2004/0145741 A1 | 7/2004 | Cole et al. |
| 2004/0150830 A1 | 8/2004 | Chan |
| 2004/0151436 A1 | 8/2004 | Chan |
| 2005/0082480 A1 | 4/2005 | Wagner et al. |
| 2005/0123244 A1 | 6/2005 | Block et al. |
| 2005/0248758 A1 | 11/2005 | Carron et al. |
| 2005/0248759 A1* | 11/2005 | Wang ............... G01J 3/0218 356/301 |
| 2006/0159411 A1 | 7/2006 | Miller |
| 2006/0166302 A1 | 7/2006 | Clarke et al. |
| 2006/0170931 A1 | 8/2006 | Guo et al. |
| 2006/0233504 A1 | 10/2006 | Hochberg et al. |
| 2006/0251371 A1* | 11/2006 | Schmidt ............. G01N 21/6454 385/129 |
| 2007/0013908 A1 | 1/2007 | Lee et al. |
| 2007/0041729 A1 | 2/2007 | Heinz et al. |
| 2007/0076208 A1 | 4/2007 | Koo |
| 2007/0077595 A1 | 4/2007 | Koo et al. |
| 2007/0237457 A1 | 10/2007 | Davis et al. |
| 2008/0144001 A1 | 6/2008 | Heeg et al. |
| 2008/0144672 A1 | 6/2008 | Cohen et al. |
| 2008/0297799 A1* | 12/2008 | Caron ............... G01N 21/7703 356/432 |
| 2009/0219525 A1 | 9/2009 | Marcus et al. |
| 2010/0017159 A1 | 1/2010 | Burke |
| 2010/0039644 A1 | 2/2010 | Choi et al. |
| 2010/0130870 A1 | 5/2010 | Kopriva |
| 2010/0290042 A1* | 11/2010 | Vakhshoori ............ G01N 21/65 356/301 |
| 2011/0116741 A1 | 5/2011 | Cevini et al. |
| 2011/0125078 A1 | 5/2011 | Denison et al. |
| 2011/0189050 A1 | 8/2011 | Schlereth et al. |
| 2012/0105843 A1 | 5/2012 | Hirai et al. |
| 2012/0215073 A1 | 8/2012 | Sherman et al. |
| 2012/0242993 A1 | 9/2012 | Schick et al. |
| 2013/0046357 A1 | 2/2013 | Neev |
| 2013/0071850 A1 | 3/2013 | Duer |
| 2013/0259747 A1 | 10/2013 | Lee et al. |
| 2013/0321816 A1 | 12/2013 | Dattner et al. |
| 2013/0328866 A1 | 12/2013 | Woodgate et al. |
| 2014/0092385 A1 | 4/2014 | Nitkowski et al. |
| 2014/0098371 A1* | 4/2014 | Sabry ............... G01J 3/0218 356/452 |
| 2014/0375999 A1 | 12/2014 | Okamoto |
| 2015/0010994 A1 | 1/2015 | Rao et al. |
| 2015/0116721 A1 | 4/2015 | Kats et al. |
| 2015/0146203 A1 | 5/2015 | Lai et al. |
| 2016/0109294 A1 | 4/2016 | Kasper et al. |
| 2016/0157706 A1 | 6/2016 | Pisanello et al. |
| 2016/0258876 A1* | 9/2016 | Al Hosani ............ G01J 3/0218 |
| 2016/0305797 A1 | 10/2016 | Pietrasik et al. |
| 2017/0108439 A1* | 4/2017 | Stievater ............. G02B 6/124 |
| 2017/0227391 A1 | 8/2017 | Hu et al. |
| 2018/0011249 A1 | 1/2018 | Zhu et al. |
| 2018/0080824 A1 | 3/2018 | Lucey |
| 2018/0106671 A1 | 4/2018 | Claes |
| 2018/0140172 A1 | 5/2018 | Hu et al. |
| 2018/0274981 A1 | 9/2018 | Hu et al. |
| 2019/0049300 A1 | 2/2019 | Gu et al. |
| 2019/0285473 A1 | 9/2019 | Hu et al. |
| 2019/0331529 A1 | 10/2019 | Hu et al. |
| 2020/0256728 A1 | 8/2020 | Kita et al. |
| 2021/0025756 A1 | 1/2021 | Gu et al. |

OTHER PUBLICATIONS

International Search Report and Written Opinion dated Oct. 6, 2016 for International Application No. PCT/US16/43488, 17 pages.

Jiang et al., "Wavelength and bandwidth-tunable silicon comb filter based on Sagnac loop mirrors with Mach-Zehnder interferometer couplers," Optics Express, vol. 24, No. 3, (2016): 2183-2188.

Kita et al., "High-performance and scalable on-chip digital Fourier transform spectroscopy." Nature communications 9.1 (2018): 4405. 7 pages.

Kita et al., "On-Chip Infrared Spectroscopic Sensing: Redefining the Benefits of Scaling," in IEEE Journal of Selected Topics in Quantum Electronics, vol. 23, No. 2, pp. 340-349, Mar.-Apr. 2017, Art No. 5900110. doi: 10.1109/JSTQE.2016.2609142.

Klutz et al., "Developing the biofacility of the future based on continuous processing and single-use technology." Journal of biotechnology 213 (2015): 120-130.

Koonen, A. M. J. et al., "Silicon Photonic Integrated Mode Multiplexer and Demultiplexer," IEEE Photonics Technology Letters, 24(21): 1961-1964 (2012).

Kraft et al., "MEMS-based Compact FT-Spectrometers—A Platform for Spectroscopic Mid-Infrared Sensors," Sensors (2008): 1-4.

Kuczewski et al., "A single-use purification process for the production of a monoclonal antibody produced in a PER. C6 human cell line." Biotechnology journal 6.1 (2011): 56-65.

Kyotoku et al.,"Sub-nm resolution cavity enhanced microspectrometer." Optics Express, vol. 18, No. 1, (2010): 102-107.

Lee et al., "In situ bioprocess monitoring of *Escherichia coli* bioreactions using Raman spectroscopy." Vibrational Spectroscopy 35.1-2 (2004): 131-137.

Lee et al., "Modernizing pharmaceutical manufacturing: from batch to continuous production." Journal of Pharmaceutical Innovation 10.3 (2015): 191-199.

Lee, "Modernizing the Way Drugs Are Made: A Transition to Continuous Manufacturing." Retrieved from FDA: https://www.fda.gov/Drugs/NewsEvents/ucm557448.htm (2017). 3 pages.

Lee, C.-K. et al., "Light field acquisition using wedge-shaped waveguide," 2013 IEEE International Conference on Consumer Electronics (ICCE), pp. 228-229.

(56) References Cited

OTHER PUBLICATIONS

Levine et al., "Efficient, flexible facilities for the 21st century." BioProcess Int 10.11 (2012): 20-30.
Lin et al., "Double resonance 1-D photonic crystal cavities for single-molecule mid-infrared photothermal spectroscopy: theory and design," Optics Letter, vol. 37, No. 8, (2012): 1304-1306.
Ma et al., "CMOS-Compatible Integrated Spectrometer Based on Echelle Diffraction Grating and MSM Photodetector Array." Photonics Journal, vol. 5, No. 2, (2013): 6600807-6600807.
Martens et al., "Compact Silicon Nitride Arrayed Waveguide Gratings for Very Near-Infrared Wavelengths," in IEEE Photonics Technology Letters, vol. 27, No. 2, pp. 137-140, 15 Jan. 15, 2015. doi: 10.1109/LPT.2014.2363298.
Miller, "Perfect optics with imperfect components." Optica 2.8 (2015): 747-750.
Momeni et al., "Integrated photonic crystal spectrometers for sensing applications," Optics Communications, vol. 282, No. 15, (2009): 3168-3171.
Nedeljkovic et al., "Mid-Infrared Silicon-on-Insulator Fourier-Transform Spectrometer Chip," IEEE Photonics Technology Letters, vol. 28, No. 4, (2016): 528-531.
Nitkowski et al., "Cavity-enhanced on on-chip absorption spectroscopy using microring resonators," Optics Express, vol. 16, No. 16, (2008): 11930-11936.
Nitkowski et al., "On-chip spectrophotometry for bioanalysis using microring resonators," Biomedical Optics Express, vol. 2, No. 2, (2011): 271-277.
Overton, "How spectrometers have shrunk and grown since 2010," Laser Focus World, vol. 52, No. 2, (2016): 35-41.
Pathak et al., "Comparison of AWGs and Echelle Gratings for Wavelength Division Multiplexing on Silicon-on-Insulator," in IEEE Photonics Journal, vol. 6, No. 5, pp. 1-9, Oct. 2014, Art No. 4900109. doi: 10.1109/JPHOT.2014.2361658.
Petit et al., "Compositional dependence of the nonlinear refractive index of new germanium-based chalcogenide glasses," Journal of Solid State Chemistry, vol. 182, No. 10, (2009): 2756-2761.
Pisanello, F. et al., "Multipoint-Emitting Optical Fibers for Spatially Addressable In Vivo Optogenetics," Neuron, 82(6): 1245-1254 (2014).
Redding et al., "All-fiber spectrometer based on speckle pattern reconstruction," Optics Express, vol. 21, No. 5, (2013): 6584-6600.
Redding et al., "Compact spectrometer based on a disordered photonic chip," Nature Photonics, vol. 7, No. 9, (2013): 746-751.
Redding et al., "Using a multimode fiber as a high-resolution, low-loss spectrometer," Optics Letters, vol. 37, No. 16, (2012): 3384-3386.
Reyes et al., "A novel method of creating a surface micromachined 3D optical assembly for MEMS-based miniaturized FTIR spectrometers," Proc. of SPIE, vol. 6888, (2008): 1-8.
Robinson et al., "First-principle derivation of gain in high-index-contrast waveguides," Optics Express, vol. 16, No. 21, (2008): 16659-16669.
Roelkens et al., "Silicon-based heterogeneous photonic integrated circuits for the mid-infrared," Optical Materials Express, vol. 3, No. 9, (2013): 1523-1536.
Saar et al., "Coherent Raman scanning fiber endoscopy," Optics Letters, vol. 36, No. 13, dated Jul. 1, 2011, 3 pages.
Schuler et al., "MEMS-based microspectrometer technologies for NIR and MIR wavelengths," Journal of Physics D: Applied Physics, vol. 42, No. 13, (2009): 1-13.
Sellar et al., "Comparison of relative signal-to-noise ratios of different classes of imaging spectrometer," Applied Optics, vol. 44, No. 9, (2005): 1614-1624.
Sharpe et al., "Gas-phase databases for quantitative infrared spectroscopy," Applied Spectroscopy, vol. 58, No. 12, (2004): 1452-1461.
Shiryaev et al., "Preparation of optical fibers based on Ge—Sb—S glass system," Optical Materials, vol. 32, No. 2, (2009): 362-367.
Singh et al., "Raman spectroscopy of complex defined media: biopharmaceutical applications." Journal of Raman Spectroscopy 46.6 (2015): 545-550.
Singh et al., "Mid-infrared materials and devices on a Si platform for optical sensing," Sciencce and Technology of Advanced Materials, vol. 15, No. 1, (2014): 1-15.
Smith et al., "Sensing nitrous oxide with QCL-coupled siliconon-sapphire ring resonators," Optics Express, vol. 23, No. 5, (2015): 5491-5499.
Soole et al., "Monolithic InP/InGaAsP/InP grating spectrometer for the 1.48-1.56μm wavelength range," Applied Physics Letters, vol. 58, No. 18, (1991): 1949-1951.
Stark, E. et al., "Diode probes for spatiotemporal optical control of multiple neurons in freely moving animals," J Neurophysiol, 108(1): 349-363 (2012).
Stevens et al., Developing fibre optic Raman probes for applications in clinical spectroscopy. Chem Soc Rev. Apr. 7, 2016;45(7):1919-34. doi: 10.1039/c5cs00850f. Epub Mar. 9, 2016. Review. PubMed PMID: 26956027.
Subramanian et al., "Silicon and silicon nitride photonic circuits for spectroscopic sensing on-a-chip." Photonics Research 3.5 (2015): B47-B59.
Szymanski, Raman spectroscopy: theory and practice. Springer Science & Business Media, 2012.
Tamazin et al., "Ultra-broadband Compact Adiabatic Coupler in Silicon-on-Insulator for Joint Operation in the C- and O-Bands." CLEO: Science and Innovations. Optical Society of America, 2018. 2 pages.
Travis, A. et al., "Collimated light from a waveguide for a display backlight," Optics Express, 17(22): 19714-19719 (2009).
Travis, A. R. L. et al., "Wedge Optics in Flat Panel Displays," Proceedings of the IEEE, 101(1): 45-60 (2013).
Wan et al., "High-resolution optical spectroscopy using multimode interference in a compact tapered fibre," Nature Communications, vol. 6, (2015): 1-6.
Wang et al., "Polarization-Independent Mode-Evolution-Based Coupler for the Silicon-on-Insulator Platform." IEEE Photonics Journal 10.3 (2018): 1-10.
Wen et al., "All-optical switching of a single resonance in silicon ring resonators," Optics Letters, vol. 36, No. 8, (2011): 1413-1415.
Wilkes et al., "60 dB high-extinction auto-configured Mach-Zehnder interferometer." Optics letters 41.22 (2016): 5318-5321.
Wilkins, "Disposable bioreactor sensors play catch-up." Bioprocess Int, Westborough 56 (2011). 4 pages.
Xia et al., "High resolution on-chip spectroscopy based onminiaturized microdonut resonators," Optics Express, vol. 19, No. 13, (2011): 12356-12364.
Xu et al., "High speed silicon Mach-Zehnder modulator based on interleaved PN junctions," Optical Express, vol. 20, No. 14, (2012): 15093-15099.
Xu et al., "Multimodalmultiplex spectroscopy using photonic crystals," Optical Express, vol. 11, No. 18, (2003): 2126-2133.
Yu, "Continuous manufacturing has a strong impact on drug quality." FDA Voice 12, Apr. 13, 2016. 5 pages.
Zhang et al., "A compact and low loss Y-junction for submicron silicon waveguide," Optical Express, vol. 21, No. 1, (2013): 1310-1316.
"Optical channel monitor based on planar lightwave circuit technology," Enablence, Ottawa, ON, Canada, Tech. Rep., (2010): 1-4.
Abaya, T. V. F. et al., "Characterization of a 3D optrode array for infrared neural stimulation," Biomedical Optics Express, 3(9): 2200-2219 (2012).
Aggarwal, "What's fueling the biotech engine—2010 to 2011." Nature biotechnology 29.12 (2011): 1083. 7 pages.
Akca et al., "Miniature spectrometer and beam splitter for an optical coherence tomography on a silicon chip," Optics Express, vol. 21, No. 14, (2013): 16648-16656.
Ako et al., "Electrically tuneable lateral leakage loss in liquid crystal clad shallow-etched silicon waveguides," Optics Express, vol. 23, No. 3, (2015): 2846-2856.
Babin et al., "Digital optical spectrometer-on-chip," Applied Physics Letters, vol. 95, No. 4, (2009): 1-4.

(56) References Cited

OTHER PUBLICATIONS

Bao et al., "A colloidal quantum dot spectrometer," Nature, vol. 523, (2015): 67-70.
Bauters et al., "Planar waveguides with less than 0.1 dB/m propagation loss fabricated with wafer bonding," Optics Express, vol. 19, No. 24, (2011): 24090-24101.
Birch et al., "An Updated Edlen Equation for the Refractive Index of Air," Metrologia, vol. 30, (1993): 155-162.
Birks et al. "The Photonic Lantern," Advances in Optics and Photonics, vol. 7, No. 2, (2015): 107-167.
Bock et al., "Subwavelength grating periodic structures in silicon-on-insulator: a new type of microphotonic waveguide." Optics express 18.19 (2010): 20251-20262.
Bogaerts et al., "Silicon-on-Insulator Spectral Filters Fabricated With CMOS Technology," IEEE Journal of Selected in Topics Quantum Electron, vol. 16, No. 1, (2010): 33-44.
Bogaerts et al., Silicon microring resonators. Laser & Photon. Rev. 2012, 6: 47-73. doi:10.1002/lpor.201100017.
Brouckaert et al., Planar Concave Grating Demultiplexer on a Nanophotonic Silicon-on-Insulator Platform, LEOS 2006—19th Annual Meeting of the IEEE Lasers and Electro-Optics Society, Montreal, Que., 2006, pp. 312-313. doi: 10.1109/LEOS.2006. 279091.
Carmon et al., "Dynamical thermal behavior and thermal self-stability of microcavities," Optics Express, vol. 12, No. 20, (2004): 654-656.
Chao et al., "Compact Liquid Crystal Waveguide Based Fourier Transform Spectrometer for In-Situ and Remote Gas and Chemical Sensing," Proc. of SPIE, vol. 6977, (2008): 1-11.
Cheben et al. "A high-resolution silicon-on-insulator arrayed waveguide grating microspectrometer with sub-micrometer aperture waveguides," Optics Express, vol. 15, No. 5, (2007): 2299-2306.
Chen et al., "Heterogeneously Integrated Silicon Photonics for the Mid-Infrared and Spectroscoping Sensing," ACS Nano, vol. 8, No. 7, (2014): 6955-6961.
Civitci et al., "Planar Prism Spectrometer based on Adiabatically Connected Waveguiding Slabs," Optics Communications, vol. 365, (2016): 29-37.
Coarer et al., "Wavelength-scale stationary-wave integrated Fourier transform spectrometry," Nature Photonics, vol. 1, No. 8, (2007): 473-478.
Dalir, H. et al., "Spatial mode multiplexer/demultiplexer based on tapered hollow waveguide," IEICE Electronics Express, 8(9): 684-688 (2011).
DeCorby et al., "Chip-scale spectrometry based on tapered hollow Bragg waveguides," Optics Express, vol. 17, No. 19, (2009): 16632-16645.
Deutsch et al., "High-resolution miniature FTIR spectrometer enabled by a large linear travel MEMS pop-up mirror," Proc. of SPIE, vol. 7319, (2009): 1-8.
DEWaN "Process Analytical Technologies for Pharmaceuticals: Global Markets," 2018. 263 pages.
Dewan, "Single Use Technology for Biopharmaceuticals: Global Markets," 2017. 163 pages.
Dhakal et al., "Nanophotonic waveguide enhanced Raman spectroscopy of biological submonolayers." ACS Photonics 3.11 (2016): 2141-2149.
Ding, Y. et al., "On-chip two-mode division multiplexing using tapered directional coupler-based mode multiplexer and demultiplexer," Optics Express, 21(8): 10376-10382 (2013).
Dong et al., "Nano-Silicon-Photonic Fourier Transform Infrared (FTIR) Spectrometer-on-aChip," Optical Society of America, vol. 1, (2015): 3-4.

Dorrer et al., "RF spectrum analysis of optical signals using nonlinear optics." Journal of lightwave technology 22.1 (2004): 266. 9 pages.
Du et al., "Low-loss photonic device in Ge—Sb—S chalcogenide glass," Optics Letters, vol. 41, No. 13, (2016): 3090-3093.
Dumais et al., "2×2 Multimode Interference Coupler with Low Loss Using 248 nm Photolithography," Optical Society of America, (2016): 19-21.
Evans et al., "TiO2 nanophotonic sensors for efficient integrated evanescent Raman spectroscopy." ACS Photonics 3.9 (2016): 1662-1669.
Fisher, "Going with the flow: continuous manufacturing," Pharmaceutical Technology, Jan. 22, 2012. 24 pages.
Florjanczyk et al., "Multiaperture planar waveguide spectrometer formed by arrayed Mach-Zehnder interferometers," Optics Express, vol. 15, No. 26, (2007): 18176-18189.
Food and Drug Administration, and Process Analytical Technology Initiative. "Guidance for Industry PAT—A Framework for Innovative Pharmaceutical development." Manufacturing and Quality Assurance (2004). 19 pages.
Gan et al., "A high-resolution spectrometer based on a compact planar two dimensional photonic crystal cavity array," Applied Physics Letters, vol. 100, No. 23, (2012): 1-4.
Gehm et al., "Static two-dimensional aperture coding for multimodal, multiplex spectroscopy," Applied Optics, vol. 45, No. 13, (2006): 2965-2974.
Guideline, ICH Harmonised Tripartite. "Pharmaceutical development." Q8. Current Step 4 (2009). 11 pages.
Harris et al., "Efficient, compact and low loss thermo-optic phase shifter in silicon," Optics Express, vol. 22, No. 9, (2014): 83-85.
Herres et al.,"Understanding FT-IR Data Processing," Part 1: Data Acquistion and Fourier Transformation (1984): 352-356.
Herriott et al., "Folded Optical Delay Lines," Applied Optics, vol. 4, No. 8, (1965): 883-889.
Holmstrom et al., "Trace gas Raman spectroscopy using functionalized waveguides." Optica 3.8 (2016): 891-896.
Hu et al., "Cavity-Enhanced Infrared Absorption in Planar Chalcogenide Glass Microdisk Resonators: Experiment and Analysis," Journal of Lightwave Technology, vol. 27, No. 23 (2009): 5240-5245.
Hu et al., Angled multimode interferometer for bidirectional wavelength division (de)multiplexing. R Soc Open Sci. Oct. 21, 2015;2(10):150270. doi: 10.1098/rsos.150270. eCollection Oct. 2015.
Hu, "Ultra-sensitive chemical vapor detection using microcavity photothermal spectroscopy," Optics Express, vol. 18, No. 21, (2010): 22174-22186.
Hung et al., Narrowband Reflection From Weakly Coupled Cladding-Modulated Bragg Gratings, in IEEE Journal of Selected Topics in Quantum Electronics, vol. 22, No. 6, pp. 218-224, Nov.-Dec. 2016, Art No. 4402507. doi: 10.1109/JSTQE.2015.2487878.
International Preliminary Report on Patentability for International Application No. PCT/US15/062509, dated Jun. 8, 2017, 9 pages.
International Search Report and Written Opinion dated Jun. 9, 2017 from International Application No. PCT/US17/17349, 30 pages.
International Search Report and Written Opinion in PCT/US2018/045859 dated Nov. 2, 2018. 14 pages.
International Search Report and Written Opinion issued by the International Searching Authority for International Application No. PCT/US15/062509, dated Feb. 1, 2017, 10 pages.
International Search Report and Written Opinion in International Patent Application No. PCT/US2019/039689 dated Oct. 31, 2019, 17 pages.

* cited by examiner

SYSTEMS AND METHODS FOR RAMAN SPECTROSCOPY

CROSS-REFERENCE TO RELATED APPLICATIONS

This application claims priority to U.S. Provisional Application No. 62/691,073 filed Jun. 28, 2018, titled "SYSTEMS AND METHODS FOR RAMAN SPECTROSCOPY OF CHEMICAL AND BIOLOGICAL SPECIES USING PHOTONIC INTEGRATED CIRCUITS", the entire disclosure of which is incorporated herein by reference.

STATEMENT OF GOVERNMENT SUPPORT

This invention was made with Government support under Grant No. ECCS-1709212 awarded by the National Science Foundation. The Government has certain rights in the invention.

BACKGROUND

A Raman spectrometer or Raman spectrophotometer is a device that optically probes the vibrational, rotational, and low-frequency modes of a solid, liquid, or gaseous chemical or material. Raman spectroscopy is a technique for accurately quantifying the chemical structure of an unknown substance. Raman spectroscopy typically involves first illuminating a sample with a single frequency laser in the visible or near-infrared wavelength region. A fraction of the light scattered by the sample is converted to a higher optical frequency (anti-Stokes shifted), and another fraction is converted down to a lower optical frequency (Stokes shifted), with these frequencies corresponding to the intrinsic energy levels of the substance being sensed, as shown in FIG. 1. By comparing the measured spectrum to a database of known Raman spectra, the composition of single chemicals or mixtures of chemicals in the gas, liquid, or solid phase can be determined with high precision.

A conventional Raman spectrometer system may comprise several distinct sub-systems, including: (1) a single-frequency excitation source, such as a laser; (2) an optical filter that suppresses amplified spontaneous emission at wavelengths above and below the laser wavelength; (3) an optical probe or region where the light interacts with the analyte or unknown chemical of interest; (4) a dichroic mirror or optical filter that removes the light from the excitation source, letting the Stokes or anti-Stokes scattered light pass; and (5) a spectrum analyzer or spectrometer that measures the intensity of the Raman shifted light as a function of frequency or wavelength.

The waveguide-enhanced Raman spectroscopy (WERS) technique has recently been demonstrated for detecting chemical and biological species in tightly confined single-mode waveguides on a chip. However, practical implementations of this technology require fiber-coupled light to be delivered to the chip, but the presence of the silica fiber produces significant background noise in the form of fluorescence and Raman scattering from the fiber material.

Additionally, the pharmaceutical industry has traditionally relied on batch manufacturing to produce molecules of interest. The high fixed costs and low flexibility associated with the use of large, multi-use vessels have recently driven a shift towards new ways of chemical production, such as continuous manufacturing, where the production process is performed all at once along tubes and smaller vessels, and single-use technologies, which rely on disposable, smaller-volume equipment. Yet conventional analytical tools, which typically allow for the measurement of one sample at a time and whose cost prevents single usage, are hardly adapted to this new manufacturing paradigm.

SUMMARY

In some aspects, a photonic integrated circuit (PIC) for Raman spectroscopy includes a semiconductor substrate and an optical port integrated with the semiconductor substrate. The optical port receives a Raman pump beam from an optical fiber. The PIC also includes a first filter, integrated with the semiconductor substrate and coupled to the optical port, to transmit the Raman pump beam and to reject fluorescence induced in the optical fiber by the Raman pump beam. The PIC further includes a sample waveguide, integrated with the semiconductor substrate and coupled to the first filter, to receive the Raman pump beam, to excite a sample in optical communication with the sample waveguide with at least a portion of the Raman pump beam via evanescent coupling, and to receive a scattering signal from the sample in response to the portion of the Raman pump beam.

In some aspects, a PIC for Raman spectroscopy includes a semiconductor substrate and an optical port integrated with the semiconductor substrate. The optical port receives a Raman pump beam and fluorescence induced by the Raman pump beam from an optical fiber. The PIC also includes a directional coupler, integrated with the semiconductor substrate and having a first port, a second port, and a third port. The directional coupler receives the Raman pump beam at the first port and outputs the Raman pump beam at the second port. The PIC further includes a sample waveguide integrated with the semiconductor substrate and coupled to the second port. The sample waveguide guides the Raman pump beam and the fluorescence in a first direction, and excites a sample in optical communication with the sample waveguide with the Raman pump beam via evanescent coupling. The sample waveguide also receives a scattering signal from the sample in response to the excitation, and guides the scattering signal in a second direction opposite from the first direction, and can then couple the scattering signal to a detector.

Some aspects are also directed to a bioreactor having a PIC disposed therein. Some aspects are also directed to a Raman spectroscopy system that includes a PIC as disclosed herein, and further includes an optical unit removably coupled to the PIC. The optical unit includes a light source coupled to the optical port via the optical fiber to launch the Raman pump beam into the optical fiber. The optical unit further includes a detector coupled to the second filter and to receive and detect the scattering signal transmitted by the second filter.

In some aspects, a method for Raman spectroscopy includes receiving a Raman pump beam via an optical fiber, which also includes receiving fluorescence induced in the optical fiber by the Raman pump beam. The method further includes transmitting, via a first filter, the Raman pump beam, including rejecting, by the first filter, the fluorescence induced in the optical fiber by the Raman pump beam. The method also includes receiving the Raman pump beam in a sample waveguide and exciting a sample in optical communication with the sample waveguide with at least a portion of the Raman pump beam via evanescent coupling. The method also includes receiving, via the sample waveguide, a scattering signal from the sample in response to the portion of the Raman pump beam, and transmitting, via a second filter, the scattering signal while blocking transmission of the remaining portion of the excitation beam.

In some aspects, a method for Raman Spectroscopy includes receiving, from an optical fiber, a Raman pump beam and fluorescence induced by the Raman pump beam in the optical fiber. The method also includes guiding, via a sample waveguide, the Raman pump beam and the fluorescence in a first direction, and exciting a sample in optical communication with the sample waveguide with the Raman pump beam via evanescent coupling. The method further includes receiving, via the sample waveguide, a scattering signal from the sample in response to the excitation, and guiding, via the sample waveguide, the scattering signal in a second direction opposite from the first direction.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 is an example energy diagram depicting changes in frequency of Raman scattered light that correspond to different molecular energy levels.

FIG. 2 illustrates an example system including an optical unit and multiple photonic integrated chips (PICs). Specifically, the system constitutes an example sensing platform with an optical control unit housing the fiber-integrated optical components and inexpensive/replaceable silicon nitride photonic chips that can be placed in multiple single-use bioreactors or in series for continuous-flow measurements. Each photonic chip can be in a different bioreactor. In some cases, two or more photonic chips can be in the same bioreactor, and the sensing regions of each respective photonic chip can be functionalized in the same way, or differently. Optical multiplexers and de-multiplexers can include commercially available MEMS-based optical switches.

FIG. 3A is an example photonic integrated chip (PIC) with an on-chip Raman sensing probe to efficiently collects backwards scattered Raman light, eliminating the need for on-chip filtering of the laser signal and suppressing the background fluorescence and Raman light generated in the input/output optical fibers. The Raman sensing probe includes a 2×1 component, such as a directional coupler, for controlling light flow.

FIG. 6C illustrates multiple sensors/chips similar to that in FIG. 6A arranged in tandem, with the sample outflow of a first chip being the sample inflow into the next chip, and so on.

DETAILED DESCRIPTION

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

Figure 3:
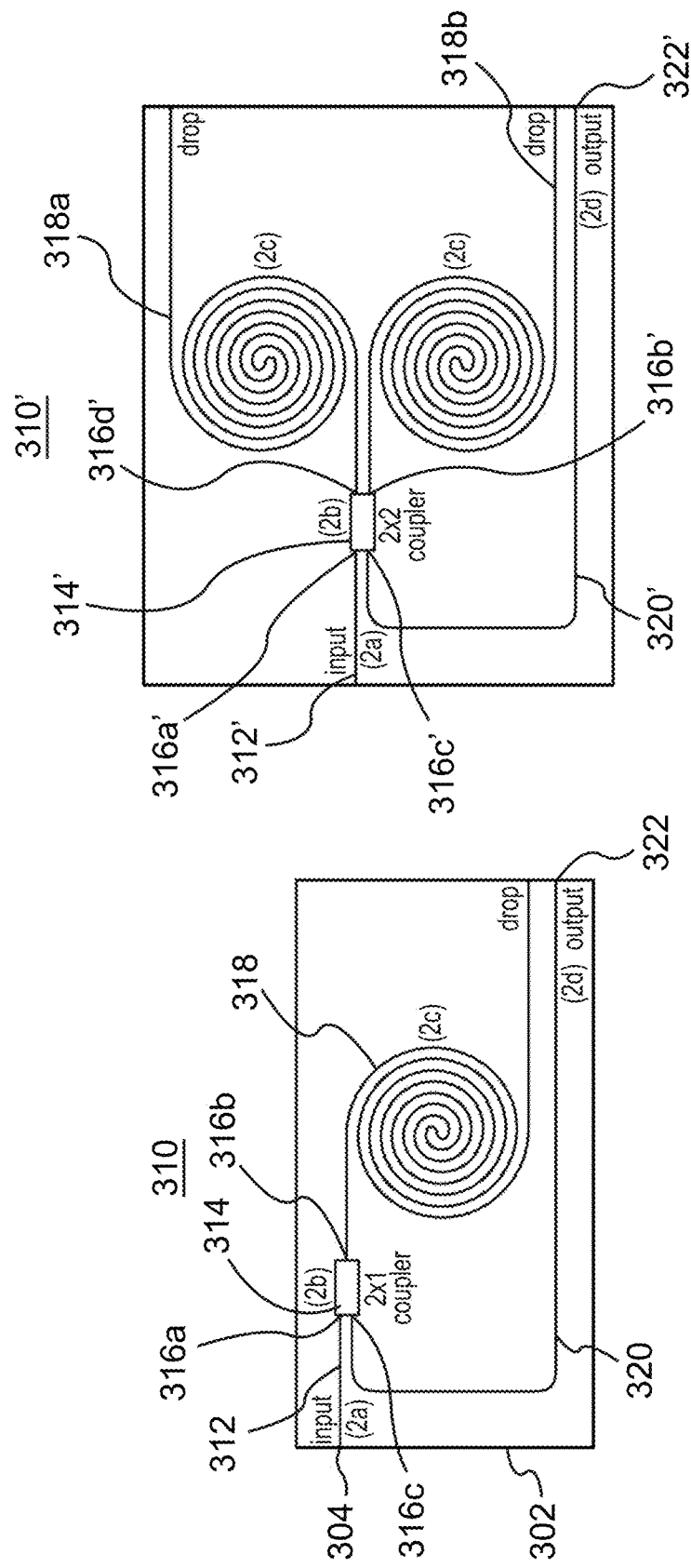
FIG. 3B is an example PIC similar to FIG. 3A but including a Raman sensing probe using a 2×2 component for controlling light flow, as well as an additional sensing region and an additional output waveguide.

Aspects of the Raman spectroscopy chips disclosed herein encompass small scale, modular, scalable design while reducing fluorescence (due to optical fibers for light delivery) from optical coupling to external light sources, and yet achieving higher SNR than conventional, free-space Raman spectrometers. An unreactive, bio/chemi-compatible exterior permits for use in a wide variety of environments, from harsh chemical settings to sensitive biological environments. Further, a simple optical design that embeds or integrated most components in a semiconductor substrate, while employing simple fiber-optic filter operation or filter-free, wavelength-independent operation (e.g., see FIGS. 3A-3B, explained in more details later), is easily and cost-effectively reproduced and tweaked for flexible use.

Example System Design Aspects

As disclosed herein, on-chip photonic spectroscopy can be used for chemical sensing in biological and/or chemical environments. On-chip photonic spectroscopy can be implemented with on-chip sensing and spectral filtering to overcome the fiber fluorescence challenge associated with WERS. Additionally, on-chip photonic spectroscopy can be used in a system that comprises multiple low-cost sensing probes and is fully compatible with continuous manufacturing and single-use technologies.

Aspects disclosed herein can leverage mature photonics capabilities to miniaturize Raman spectroscopy, a gold-standard technique for selectively identifying and quantifying biological and chemical species in complex environments. Chip-integrated, real-time Raman sensors as disclosed herein can enable faster and more efficient production of pharmaceuticals with continuous manufacturing and single-use technologies. In addition to size reduction, this can provide several benefits, including:
a. Improved robustness (there are no free-space optical components requiring re-alignment due to integration with a semiconductor substrate).
b. Better reliability (high chip-to-chip uniformity).
c. Enhanced light-matter interaction at the surface of the chip due to evanescent coupling means sensitivities >100 times higher than free-space Raman spectrometers are possible.
d. Large cost reduction by utilizing existing high-volume silicon CMOS tools.
e. The sensors' chemical and biological sensing capabilities leverage multiple technologies in integrated photonics, such as tunable light sources, tunable filtering, and tunable detection, to enable biological and chemical monitoring.
f. Waveguide-enhanced Raman scattering (WERS) in single-mode optical waveguides
g. On-chip filtering of background noise from fiber fluorescence.
h. Chip-scale photonic packaging capabilities. The packaged photonic chip can have epoxy-bonded fibers and can be simply dropped into aqueous cell-cultures or integrated in tubing for real-time monitoring of chemical constituents (illustrated in FIGS. 6A-6C, 7A-7B, described in greater detail later).

Figure 2:
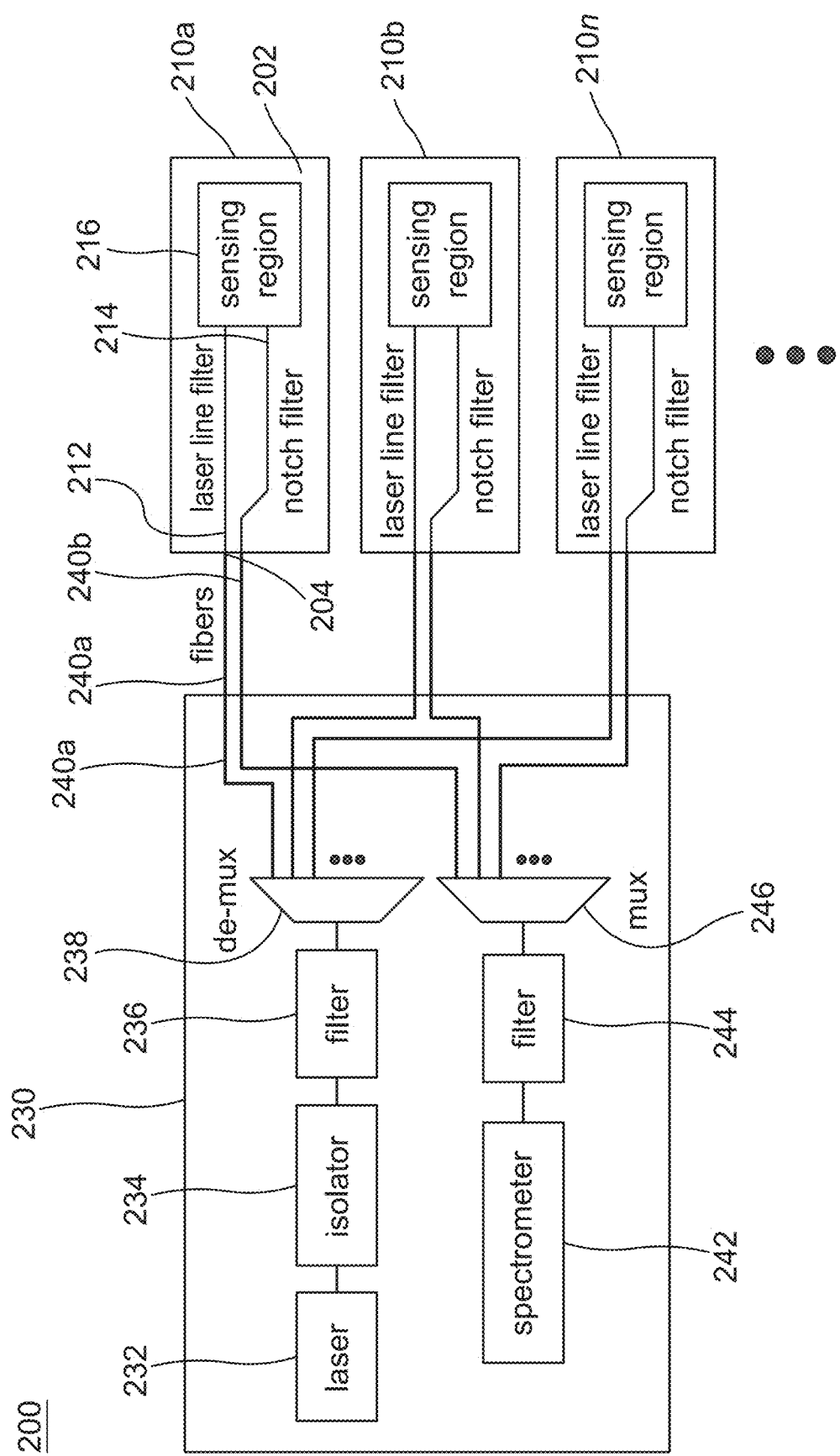

A single optical control unit/module can be connected via optical fibers to one or many photonic chips/sensing probes (e.g., as illustrated in FIG. 2, described in greater detail later) that are placed in difficult-to-reach production environments. The optical control unit can house components such as a laser, spectrometer, free-space filters, and optical multiplexer/de-multiplexers, while the photonic chip can include integrated spectral filters (e.g., for suppressing background fiber fluorescence) and a sensing region where the tightly confined optical mode interacts with neighboring chemical species. The system can also filter out background fluorescence and Raman background light generated in the optical fibers to and/or from the chip.

In the Raman sensing system disclosed here (e.g., the system 200 in FIG. 2), light from a single optical control unit can be delivered to photonic chips (via optical fiber), where it is spectrally filtered and exposed to chemicals and biological species that are in direct contact with the chip surface. The resulting Raman scattered light is efficiently coupled back into the waveguide and co-propagates with the excitation laser light towards a second filter (e.g., a distributed Bragg grating notch filter) that rejects the laser signal. The remaining Stokes-shifted Raman light then travels via a second optical fiber back to the optical control unit, where it is filtered again and then analyzed using a commercial spectrometer with cooled linear CCD array or similar detector.

The photonic chips can be made using a reliable silicon nitride photonic fabrication process and a custom process design kit (PDK). An example process flow can include a single electron-beam lithography write step to reliably define optical components with dimensions below 50 nm (e.g., including, but not limited to, filters, directional couplers, edge couplers, slot waveguides, strip-to-slot converters, and/or the like) and post-processing to both expose waveguide regions to chemical/biological species, and to define etched waveguide facets for robust edge-coupling and fiber integration. Delivering light to/from the photonic chip via optical fiber (in-between the free-space notch and laser-line filters) produces significant background fluorescence and background Raman from the silica fiber. On-chip filters to suppress this background fluorescence and background Raman (e.g., see FIGS. 4-5, described in greater detail later) and further boost the detection sensitivity.

Figure 6C:
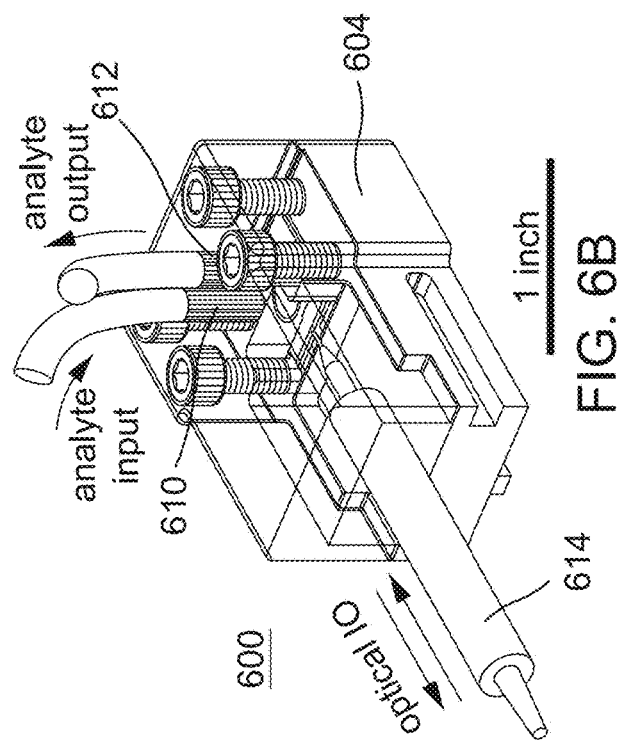
Figures 7A, 7B:
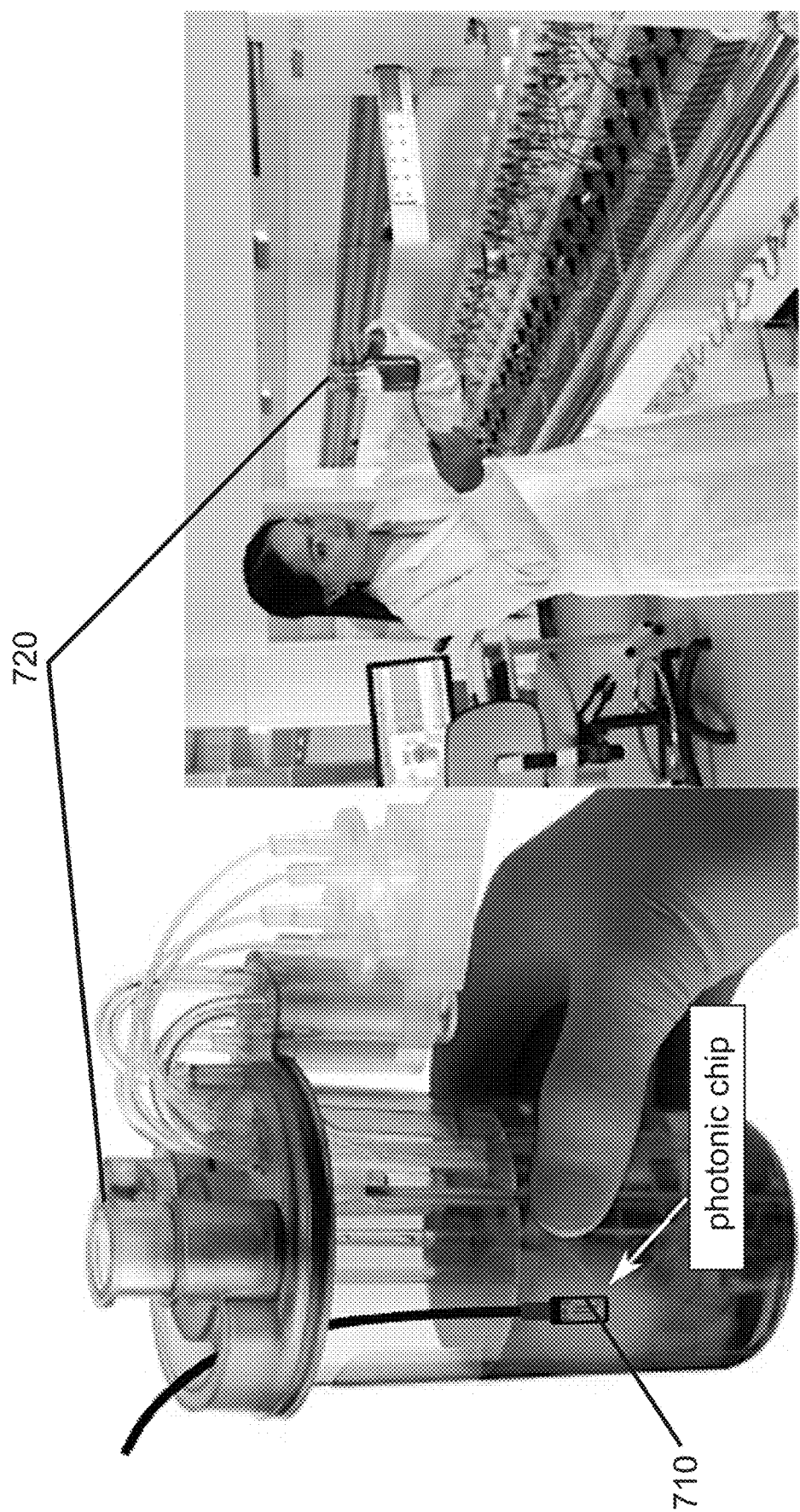
FIG. 7A illustrates an example Raman chip integrated with a small format Sartorius 250 mL ambr disposable bioreactor.
FIG. 7B illustrates a Sartorius bioreactor workbench that can house up to 24 reactor setups including a reactor integrated with a Raman chip as illustrated in FIG. 7A.

A single optical control unit can be connected in parallel to many low-cost sensor chips (e.g., see FIG. 2). The optical control unit can include an optical multiplexer/de-multiplexer (e.g., the multiplexer 246, the demultiplexer 238) that directs laser light to each low-cost sensor chip one-at-a-time. Despite this happening serially, the time to acquire a single spectrum on each probe can be on the order of seconds, which is orders of magnitude faster than the acquisition and sample preparation times of conventional analytical techniques. For cell-culture applications, such as on a Sartorius ambr250 24-bioreactor workstation as shown in FIG. 7B, each disposable bioreactor can include a sterile, miniature probe 710 attached to the inner wall before cell-culturing. In continuous-flow manufacturing applications, it can be valuable to obtain information about the chemical concentrations along the distance of the tubing and so connecting many of the Raman-sensors in-line with the flow-tubing may provide real-time data during production (see FIG. 6C). Furthermore, tethering many inexpensive probes to a single unit can dramatically reduce the overall price per sensor.

With such a Raman spectroscopy system, the data acquisition process can be automated. The acquired data can be fed back into existing controls for pharmaceutical production. This means that one can find out during which minute of the day an abnormality occurred in processing, or at what exact time cells began producing a compound of interest and take appropriate actions immediately. Distributed spectroscopic sensor networks can paint a more complete picture of the pharmaceutical production process, providing information for more efficiently and more reliably developing new drugs.

Example Raman Spectroscopy Systems

FIG. 2 illustrates an example Raman spectroscopy system 200 that includes a set of photonic integrated chips (PICs) 210a-210n, useful for performing Raman spectroscopy as described herein. Explained hereon with respect to the PIC 210a for simplicity, each such PIC can include a semiconductor substrate 202 on which one or more components can be embedded. The substrate 202 can be formed of any suitable materials such as, for example, silicon nitride, titanium dioxide, silicon carbide, silicon, indium phosphide, combinations thereof, and/or the like. The substrate 202 at least in part can be formed of a material that is optically transparent at the Raman pump beam wavelength(s) and at the Raman scattering wavelength(s) to reduce propagation loss.

The PIC 210a can also include an optical port 204 integrally formed with or on the substrate 202 for coupling to an optical fiber 240a, which can deliver a Raman pump beam from an excitation source (e.g., the laser 232, described below) to the PIC 210a. The port 204 can include any suitable connector for coupling the fiber 240a such as, for example, screw-type, clip type, snap type, push-pull type, and/or the like.

Coupled to the port 204 is a first filter 212 (illustrated here as a "laser line filter") that is integrated with the substrate 202. This filter 212 can also be integrated into or coupled the end of the fiber 240a coupled to the port 204. The filter 212 can transmit the Raman pump beam received from the fiber 240a and reject fluorescence induced in the fiber 240a by the Raman pump beam. In other words, the filter 212 can transmit light at the wavelength of the Raman pump beam and attenuate or reflect light at other wavelengths, excluding the fluorescence as the Raman pump beam and the fluorescence traverse the filter 212. The fluorescence can arise, for example, due to the Raman pump beam interacting with the silica materials of the fibers and can swamp or hide the Raman signal from the sample. As an example, the center wavelength of the filter 212 can be about the same as the wavelength of the Raman pump beam. The suppression of other wavelengths can be high as possible/permissible, such as, for example, up to 60 dB, or greater than 60 dB. The width of the passband of the filter can be wide enough to accommodate for shifts or variation in the laser wavelength, while narrow enough to cut off fluorescence and/or other spontaneous emission. In some cases, the width of the passband can be up to 5 nm, or greater than 5 nm.

The PIC 210a can include a sample waveguide (not shown, illustrated and described in greater detail with respect to FIGS. 3A-3B) underlying the sensing region 216, such as, for example, a single-mode optical fiber. The sample waveguide can be coupled to the filter 212 and also be integrated with the substrate 202. The waveguide receives the filtered Raman pump beam from the filter 212 and, by virtue of its proximity to the sensing region 216, excites a sample disposed on the region 216 and in optical communication with the sample waveguide with at least a portion of the Raman pump beam via evanescent coupling. The sample in the sensing region 216, or the vicinity thereof, can generate a scattering signal (e.g., due to Raman scattering) in response to the Raman pump beam, at least a portion of which is received by the waveguide. This scattering is isotropic; that is, unless occluded, the scattering signal propagates in all directions from the sample. At least a portion of the scattering signal evanescently couples into the waveguide and propagates along the waveguide in the same direction as the remainder/rest/remainder portion of the Raman pump beam and/or in the opposite direction as the Raman pump beam.

The PIC 210a also includes a second filter 214 (illustrated here as a "notch filter") that is integrated with the substrate 202. The filter 214 can also be integrated into or coupled to an optical fiber coupled to the PIC 210a. The second filter 214 is coupled to the sample waveguide and received the remainder portion of the Raman pump beam as well as the portion of the scattering signal. The second filter 214 can operate as a notch filter which blocks light at the wavelength(s) of the Raman pump beam and transmits light at other wavelengths, including the Raman signal wavelength(s). In this manner, the filter 214 can transmit the scattering signal to a detector, such as the spectrometer 242 via the fiber 240b for spectroscopic detection. As an example, the notch band of the filter 214 can be about the same as the wavelength of the Raman pump beam to achieve suppress as high as possible/permissible, such as, for example, up to 60 dB, or greater than 60 dB. The width of the notch band of the filter 214 can be wide enough to fully or substantially reject the laser, while narrow enough to prevent more than minimal or acceptable loss of the (useful) scattering signal. In some cases, the width of the notch band can be up to 5 nm, or greater than 5 nm.

Figure 1:
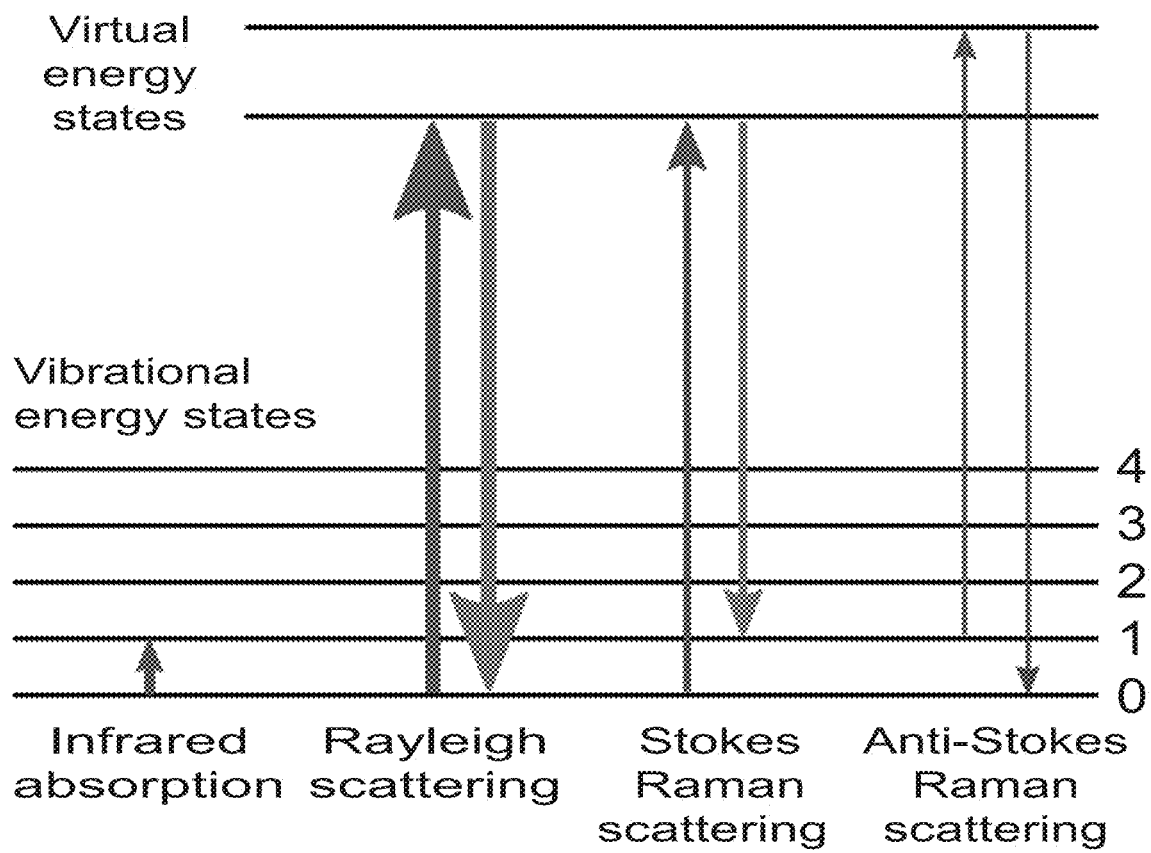

As also illustrated in FIG. 1, the system 200 also includes an optical unit/module 230 that can be removably coupled to the PICs 210a-210n such as by, for example, engaging/disengaging the connectors on the PICs for the fibers 240a, 240b. The optical unit 230 can also encompass an integrated chip-type architecture. The optical unit 230 includes a light source 232 (shown here as a laser) that couples to the optical port 204 via the optical fiber 240a and generates the Raman pump beam. The light source 232 can be coupled to an optical isolator 234 that permits one-way transmission of the Raman pump beam (the source 232 and the isolator 234 can be modular fiber-coupled components or combined in a single fiber-coupled component). The light source 232 launches the Raman pump beam into the optical fiber 240a. The optical unit 230 can also (optionally) include a filter 236 that can be similar to the filter 212, and function to remove any amplified spontaneous emission and/or other artifacts arising during the Raman pump beam generation on the optical unit itself.

On the detection side, the optical unit 230 can include a detector 242 (shown here as a spectrometer) for detecting the Raman scattering signal. Also illustrated is a (optional) filter 244 that can be similar to the filter 214 and transmits light at wavelengths other than that of the Raman pump beam.

When the optical unit 230 is to be employed with multiple PICs, it can also incorporate a de-multiplexer 238 between the source 232 and the PICs 210a-210n, and a multiplexer 246 between the scattering signal outputs of the PICs 210a-210n and the detector 242. The de-multiplexer 238 and the multiplexer 246 can include, for example, MEMS-based optical switches for temporal multiplexing and de-multiplexing. They can also be implemented as wavelength-based devices for sending Raman pump light at different wavelengths to different PICs 210a-210n. (Raman pump light at different wavelengths can be generated by tunable light source, such as a tunable laser; a broadband light source, such as a superluminescent diode; or multiple light sources, such as lasers lasing at different wavelengths.)

FIG. 3A illustrates a PIC 310 useful for Raman spectroscopy. Unless noted otherwise, similarly named components may be structurally and/or functionally similar to those describes for the PIC 202a. The PIC 310 can interface with external optical components, such as those described for the optical unit 230, for receiving a Raman pump beam and for spectroscopic detection.

The PIC 310 includes a semiconductor substrate 302 that includes an optical port 304 integrated with the substrate 302. The optical port 304 receives a Raman pump beam and fluorescence induced by the Raman pump beam from an optical fiber (not shown) and can operate in a manner similar to the optical port 204.

The PIC 310 also includes a wavelength selective, multi-port optical component 314, shown here as a directional coupler 314 with a first port 316a, a second port 316b, and a third port 316c. The coupler 314 can have, as a non-limiting example, a bandwidth greater than about 100 nm and exhibit an extinction ratio up to about 65 dB, with an insertion loss of <1 dB (in addition to any loss (e.g., about 3 dB) incurred by collecting at one output port, such as the third port 316c). The coupler 314 can be integrated with the substrate 302 and is wavelength selective in the sense that it has different splitting ratios at the Raman pump and Raman signal wavelengths. The Raman pump beam and the fluorescence can be coupled via the port 314 into the first port 316a. By virtue of the wavelength selectiveness of the coupler 314, at least half of the Raman pump beam (e.g., 50%, 90%, or 99%) is output at the second port 316b, where a sample waveguide 318 is coupled to the second port 316b. The fluorescence from the fiber is also coupled to the sample waveguide 318 via the second port 316b.

The sample waveguide 318 is illustrated here in spiral form, which can increase the interaction between the waveguide and a sample while reducing or minimizing the surface area of the substrate that is associated with, and given over to, the waveguide 318. The waveguide 318 guides the Raman pump beam and the fluorescence in a first direction along the waveguide, i.e., away from the second port 316b. The Raman pump beam can excite a sample in optical communication (e.g., overlaying or flowing past) with the waveguide 318 via evanescent coupling. The resulting scattering signal can be received by the waveguide 318, and some portion thereof is coupled into the waveguide 318 and propagates in a second direction along the waveguide 318 that is opposite to the first direction, i.e., towards the second port 316b. (The waveguide 318 may guide some Raman-scattered light in the first direction too.) In other words, at least some of the collected Raman signal counter-propagates along the waveguide 318 toward the directional coupler 314.

The scattering signal that propagates in the second direction can then be received (at the second port 316b) and then output (by the third port 316c) by the coupler 314 to an output waveguide 320. Depending on the directional coupler's wavelength selectivity, 50%, 90%, 99% or more of the scattering signal is coupled out of the third port 316c, with the remainder coupled out of the first port 316a. In this manner, any remaining portion of the Raman pump beam and the fluorescence that propagates in the sample waveguide in the first direction is never returned to the second port 316b and is effectively filtered out without the use of any filter components like those in the PIC 210a. The output waveguide 320 similarly does not include any filter components, but nevertheless provides at its output the desired scattering signal, which in turn can be provided to a detector (e.g., the detector 242) via appropriate coupling means. The effective rejection of the Raman pump beam and the fluorescence can be on the order of up to 65 dB, or higher than 65 dB.

FIG. 3B illustrates a PIC 310' that uses more of the Raman pump light than the PIC 310 thanks to a fourth port 316d' on the directional coupler 314' that is coupled to an additional/second sample waveguide 318b (the first sample waveguide is reference no. 318a here). The coupling ratios for the coupler 314' can be changed by changing one or more of the gap, width, or length of the coupling region of the waveguide, or both. In this setup, the first sample waveguide 318a receives (i.e., the directional coupler 314' couples) a first portion (e.g., 50%) of the Raman pump beam and a first portion of the fluorescence, while the second sample waveguide 318b receives the remainder (e.g., 50%) of the Raman pump beam and a second/remainder portion of the fluorescence. This ensures that all of the Raman pump beam excites the sample (neglecting insertion loss, attenuation, etc.). During operation, both waveguides 318a, 318b excite the sample and receive counter-propagating scattering signals. The directional coupler 314' couples the (first) scattering signal from the first waveguide 318a and the (second) scattering signal from the second waveguide 318b through the output waveguide 320' to output 322', which may be coupled to a detector (not shown). Again, because the scattering signals propagate in the opposite direction as the Raman pump beam and fluorescence from the input fiber, they are not present at the output 322'. The effective rejection of the Raman pump beam and the fluorescence can be on the order of up to 65 dB, or higher than 65 dB. In this manner, signal collection from the sample can be increased by the PIC 310' relative to the PIC 310 which can lose half the Raman pump beam at the directional coupler 314. In the PIC 310', on the other hand, the entire Raman pump beam can be consumed and used to excite the sample.

As noted above for the PIC 210a, one or more PICs 310 and/or 310' can be removably coupled to an optical unit including excitation and detection components, such as the optical unit 210. As an example, the input ports 304, 304' can be coupled to the optical unit 210 via the demultiplexer 238, and the outputs 322, 322' can be coupled to the optical unit via the multiplexer 246.

Figure 4:
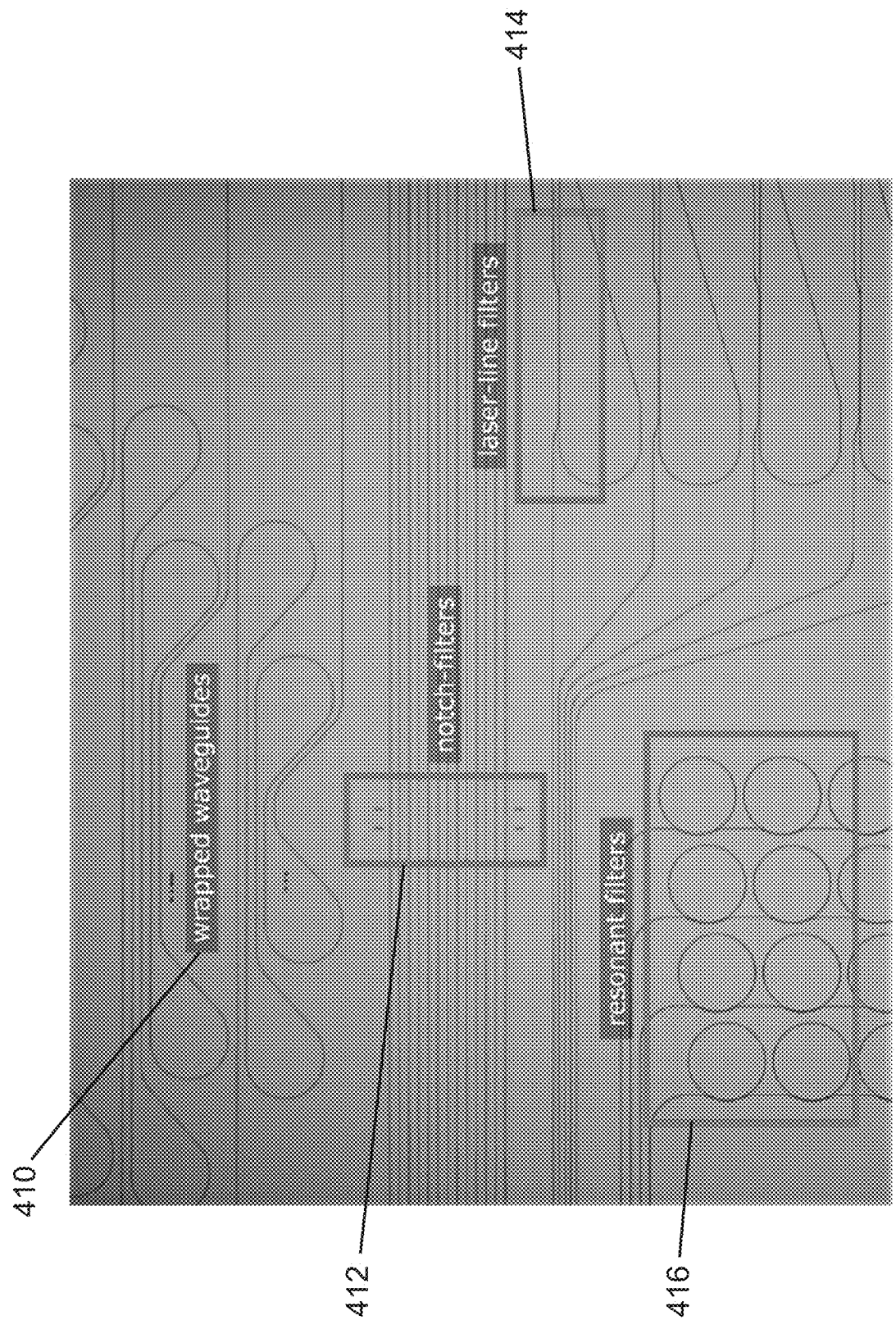
FIG. 4 is a microscope image of different kinds of visible/near-infrared optical filters and waveguides fabricated on a silicon nitride photonics platform.

FIG. 4 illustrates example fabrication of different components of the PICs 210a, 310, 310' on a silicon nitride photonics platform/substrate. Waveguides 410 are wrapped in a bow-tie manner and can provide an alternative design to the spiral form of the waveguides 318, 318a, 318b. The notch filters 412 are in a substantially linear configuration, and the filters 214, 244 can be designed and/or laid out in this manner. The laser-line filters 414 are in an elongated looped configuration, and the filters 212, 236 can be designed and/or laid out in this manner. The resonant filters 416 form a series of circular loops and can be used to design the filters 212, 214 described herein.

Figure 5:
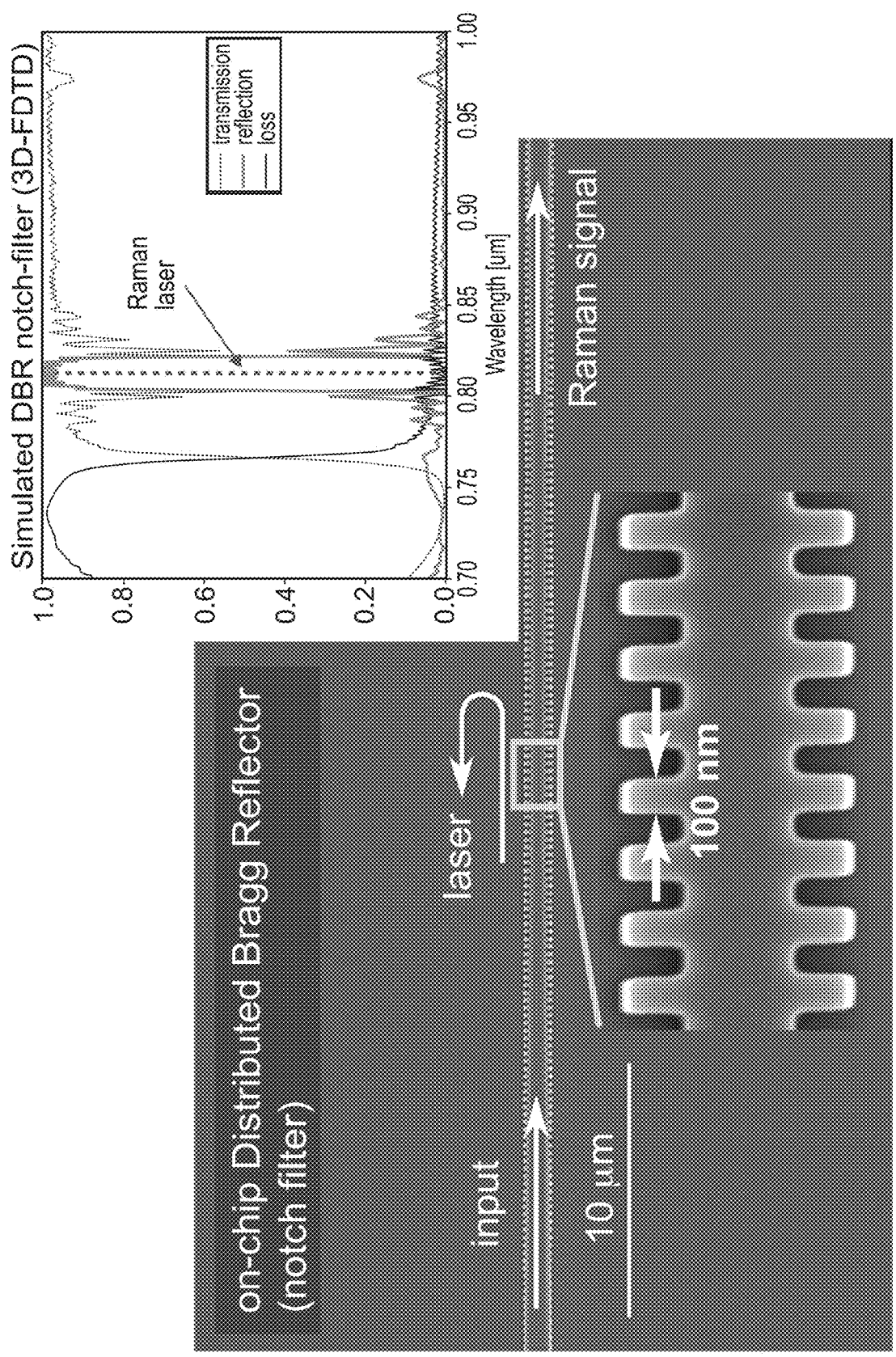
FIG. 5 is a scanning electron micrograph images of a $Si_3N_4$ waveguide distributed Bragg reflector fabricated at MIT for filtering out the laser wavelength. The inset plot illustrates the transmission characteristics of the waveguide that enable its operation as a notch filter.

FIG. 5 shows detail of an example, silicon waveguide distributed Bragg reflector for filtering out the laser wavelength (e.g., similar to the operation of the filters 214, 244) via reflection while permitting the Raman scattering signal to propagate. This example design is a comb-like configuration.

Figure 6B:
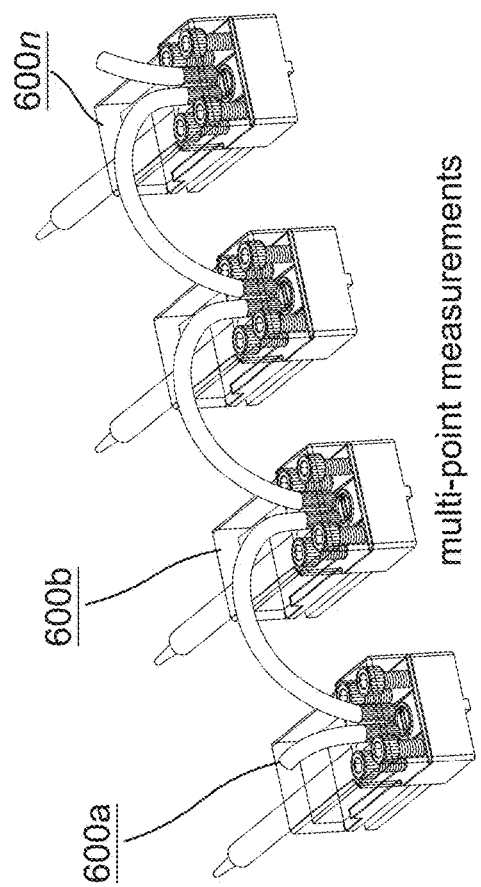
FIG. 6B is another perspective view of the sensor of FIG. 6A.
Figure 6A:
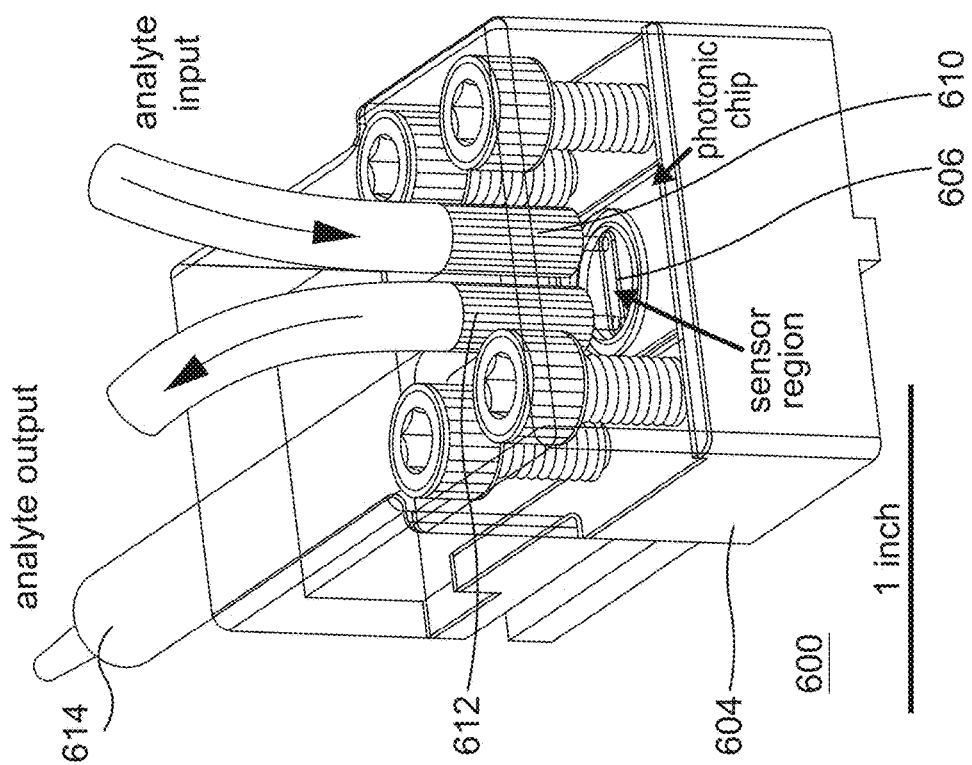
FIG. 6A is a perspective view of an example flow-integrated Raman spectroscopic sensor/chip showing details of analyte flow and optical coupling. The rigid casing of the sensor and the tight seal created by an O-ring can enable spectroscopic sensing of pharmaceuticals at high temperatures and pressures.

FIGS. 6A and 6B illustrate a Raman sensing system 600 with a replaceable (and optionally disposable) PIC 610 (e.g., similar to the PICs 210a, 310, 310') useful in fluid tight settings with controlled sample flow. The sensing system 600 includes and/or is couplable to a housing 604 that provides a fluid tight compartment for the various components within. As illustrated in FIGS. 6A-6B, an opening 614 can provide for optical coupling of the PIC 610 to external components (e.g., for coupling the fibers 240a, 240b). A sample holding region 606 within the housing is in optical communication with the PIC 610 and holds the sample during analysis. A sample input port 616 is formed on the surface of the housing 604 and is coupled to the sample holding region 606 to permit inflow of the sample for analysis with the PIC 610. At the other end of the sample holding region 606 (best illustrated in FIG. 6B) a sample output port 612 is formed on the surface of the housing 604 and is coupled to the sample holding region 606 to permit outflow/circulation of sample.

FIG. 6C illustrates multiple Raman sensing systems 600a-600n, each with a different PIC (not shown), that can be used for multi-point measurements on the same sample. As illustrated in FIG. 6C, the sample can be input into the Raman sensing system 600a via its sample input port, and then output via its sample output port and into the sample input port of the Raman sensing system 600b, and so on. Multiple, redundant measurements can be made possible when each of the Raman sensing systems 600a-600n and PICs is configured the same way (e.g., has the same filter characteristics). Additionally, different measurements on the same sample can be made possible when each of the Raman sensing systems 600a-600n is configured differently (e.g., employs different excitation wavelengths).

FIG. 7A illustrates an example PIC design 710 (e.g., each similar to the PICs 210a, 310, 310') useful for sample immersion measurements. In such setups, the PIC 710 is immersed in the sample, with the sample waveguide bordering or interfacing with an external surface of the PIC's semiconductor substrate (e.g., the substrate 202, 302)

exposed to the sample. The exposed, external surface can include a coating to prevent adhesion of the sample, to maintain a sterile environment by preventing microbial growth, and/or the like. The coating can include a fluorinated polymer, aluminum oxide, and/or the like.

Accordingly, aspects disclosed herein can be directed to bioreactor devices, such as the bioreactor 720 illustrated in FIG. 7A, that have a PIC 710 (e.g., similar to the PICs 210a, 310, 310') disposed therein such as for, for example, for monitoring the microenvironment of the bioreactor. FIG. 7B illustrates a series of bioreactors similar to the 720 each including the photonic chip 710 disposed therein.

Aspects disclosed herein can also be directed to continuous flow systems, such as flow cytometry for example, where a PIC (e.g., similar to the PICs 210a, 310, 310') can be positioned inline with flow for continuous sample analysis.

Example Raman Spectroscopy Methods

Aspects disclosed herein can also be directed to methods for Raman spectroscopy using, for example, a PIC similar to the PIC 210a. The method can include receiving a Raman pump beam (e.g., generated by the light source 232) via an optical fiber (e.g., the fiber 240a), which also includes receiving fluorescence induced in the optical fiber by the Raman pump beam. The method further includes transmitting, via a first filter (e.g., the filter 212), the Raman pump beam, and rejecting, by the first filter, the fluorescence induced in the optical fiber by the Raman pump beam. The method also includes receiving the Raman pump beam in a sample waveguide (e.g., the waveguide 318, 318a, 318b) and exciting a sample in optical communication with the sample waveguide with at least a portion of the Raman pump beam via evanescent coupling. The method also includes receiving, via the sample waveguide, a scattering signal from the sample in response to the portion of the Raman pump beam, and transmitting (e.g., to the detector 242), via a second filter (e.g., the filter 214), the scattering signal while blocking transmission of the remaining portion of the excitation beam.

The method can also encompass pumping a sample into (e.g., via the sample input port 610) a sample holding region (e.g., the sample holding region 606) in optical communication with the sample waveguide prior to exciting the sample. The method can also encompass pumping out (e.g., via the sample output port 612) the sample after exciting the sample.

Aspects disclosed herein can also be directed to methods for Raman spectroscopy using, for example, a PIC similar to the PIC 310, 310'. The method includes receiving, from an optical fiber (e.g., at the port 304, via the fiber 240a), a Raman pump beam and fluorescence induced by the Raman pump beam in the optical fiber. The method also includes guiding, via a sample waveguide (e.g., the waveguide 318, 318a, 318b), the Raman pump beam and the fluorescence in a first direction and exciting a sample in optical communication with the sample waveguide with the Raman pump beam via evanescent coupling. The method further includes receiving, via the sample waveguide, a scattering signal from the sample in response to the excitation, and guiding, via the sample waveguide, the scattering signal in a second direction (e.g., towards the second port 316b, 316b') opposite from the first direction, and towards a detector (e.g., the detector 242).

The method can also encompass guiding, via a second sample waveguide (e.g., the waveguide 318b, where the waveguide 318a is a first waveguide), a second portion of the Raman pump beam and a second portion of the fluorescence in the first direction (i.e., away from the fourth port 318d). The method can also include exciting the sample in optical communication with the second sample waveguide with the second portion of the Raman pump beam via evanescent coupling, and receiving a second scattering signal from the sample in response. The second scattering signal is guided in the second direction (i.e., towards the fourth port 318d), and then guided towards the detector.

Aspects disclosed herein can also be directed to methods for Raman spectroscopy using, for example, a PIC similar to the PIC 210a, 310, 310'. The method can include guiding a Raman pump beam with an optical fiber (e.g., the fiber 212), the Raman pump beam inducing fluorescence in the optical fiber. The method can further include coupling the Raman pump beam and the fluorescence to a photonic integrated circuit (PIC, similar to the PIC 210a, 310, 310') via the optical fiber. The method can also include exciting a sample in optical communication with the PIC with the Raman pump beam via evanescent coupling, such that the Raman pump beam inducing Raman scattering in the sample. The Raman scattering is collected via the PIC, and the Raman pump beam and the fluorescence are filtered, also via the PIC, from the Raman scattering. In some cases, the coupling can include coupling the Raman pump beam and the fluorescence to a filter (e.g., the filter 212) of the PIC (e.g., the PIC 210a) that transmits the Raman pump beam and rejects the fluorescence. In some cases, the filtering can include guiding the Raman scattering propagating along a second direction (e.g., towards the second port 318b and/or the fourth port 318d) opposite to a first direction of propagation of the Raman pump beam and the fluorescence.

Example Features

An example on-chip photonic Raman spectroscopy system can detect chemical and biological species while simultaneously suppressing the fluorescent light and Raman scattered light produced from the optical fibers. The example system may include one or more of the following features:
 (1) A chip-scale Raman sensing probe with the following discrete elements (e.g., see FIG. 2):
  a. A fiber-to-chip coupling region, wherein light from the optical fiber (e.g., the fiber 240a) is transmitted to a single-mode photonic waveguide.
  b. An on-chip filter (e.g., the filter 212) after the fiber-to-chip coupling region that serves to transmit the laser wavelength and block light at wavelengths above and below the laser wavelength.
  c. A waveguide sensing region (e.g., the region 216 having a sample waveguide) after the first on-chip filter, wherein evanescent light from the waveguide mode scatters with chemicals of interest and is collected back by the waveguide.
  d. An on-chip filter (e.g., the filter 214), after the waveguide sensing region, that transmits light at wavelengths above or below the laser wavelength and blocks light in a wavelength band that includes the laser wavelength.
  e. A chip-to-fiber coupling region, wherein light from the single mode photonic waveguide is transmitted to an optical fiber (e.g., the fiber 240b).
 (2) A chip-scale Raman sensing probe with the following discrete elements (e.g., see FIGS. 3A-3B):
  a. A fiber-to-chip coupling region, wherein light from the optical fiber is transmitted to a single-mode photonic waveguide.
  b. A 4-port optical component (such as an adiabatic 2×2 directional coupler or a 2×2 multi-mode interferometer, see the coupler 314'), which couples light from the fiber-to-chip coupling region to two output waveguides via the top input (e.g., the port 316a). Alternatively, this component can be a 3-port device (such as a 2×1 directional coupler or 2×1 multi-mode interferometer, see the coupler 314) that couples light from fiber-to-chip coupling region to the single output waveguide via the top input (e.g., via the ports 316a, 316b).

c. One (e.g., a region associated with the waveguide 318) or two waveguide (e.g., a region associated with the waveguides 318a, 318b) sensing regions after the 2×2 or 2×1 component, wherein evanescent light from the waveguide mode scatters with chemicals of interest that is collected in the waveguide and propagates in the opposite direction as the light from directional coupler. The Raman light then travels back to the 2×2 or 2×1 directional coupler, where some of the light travels to the bottom input waveguide.

d. A waveguide (e.g., the output waveguide 320, 320') that connects the bottom input of the 2×2 or 2×1 directional coupler to a chip-to-fiber optical coupling region, wherein light from the single mode photonic waveguide is transmitted to an optical fiber.

(3) A Raman spectroscopy system (e.g., see FIGS. 2, 3A-3B) that includes:

a. One or more of the chip-scale Raman sensing probes (e.g., the PIC 210a, 310, 310') described immediately above.

b. One or more single-mode optical fibers (e.g., the fibers 240a, 240b) that connect and deliver light to/from the optical control/unit described immediately below with each Raman sensing probe.

c. An optical control unit/module with the following elements:
  i. A single-frequency light source (e.g., the source 232), such as a 780 nm continuous-wave laser (or a laser at any other wavelength)
  ii. (optional) An optical isolator (e.g., the isolator 234), after the single-frequency light source (either a separate module or one integrated with the single-frequency light source)
  iii. (optional) A polarization control module (not shown) that corrects for small polarization differences between the output laser and the desired optical polarization of the photonic chip's waveguide
  iv. (optional) A free-space or fiber-integrated optical filter (sometimes called a 'laser-line filter', e.g., the filter 236), that has high transmission at the laser wavelength and low transmission at wavelengths above and below the laser wavelength. This can suppress amplified spontaneous emission that is a large source of background noise in Raman spectroscopy systems
  v. (optional) An optical demultiplexer (e.g., the demultiplexer 238), comprising one or more optical switches, that directs light from the one laser source to one or many optical fibers that are each connected to the photonic chips.
  vi. (optional) An optical multiplexer (e.g., the multiplexer 246) that receives as input one fiber from each of the photonic chips and directs the light to a single optical fiber output.
  vii. (optional) A free-space or fiber-integrated optical filter (sometimes called a 'notch-filter', e.g., see the filter 244) that has high transmission at wavelengths above and below the laser wavelength and low transmission at the laser wavelength.
  viii. A spectrometer (e.g., the detector 242) that receives the Raman-scattered optical signal(s) and measures the intensity at each wavelength of interest corresponding to the Raman-scattered optical signal.

(4) The fiber terminations at the chip-coupling region may be:
  a. flat-cleaved, allowing for low-loss coupling to low-index-contrast waveguides due to reduced mode-field diameter mismatch;
  b. tapered and lensed;
  c. in a linear fiber array made of flat-cleaved fibers mounted in v-grooves;
  d. tapered and pitch-reduced (e.g., forming a Pitch Reducing Fiber Optical Array); and/or
  e. coupled to a mode-converting interposer chip.

(5) A chip-scale Raman sensing probe as above with coupling regions that comprise one or more of:
  a. inverse tapered couplers at the edge of the chip;
  b. sub-wavelength grating couplers at the edge of the chip; and/or
  c. fiber grating couplers that direct light upwards out of the chip to a fiber.

(6) A Raman sensing probe, as above, with optical filters that are composed of:
  a. Ring or disk resonators,
  b. Periodic Bragg reflectors (DBRs), and/or
  c. Contra-directional couplers.

(7) A chip-scale Raman sensing probe as above fabricated using silicon nitride, titanium dioxide, silicon carbide, silicon, indium phosphide, or any other material that is optically transparent in the wavelength region of interest, as the waveguiding material.

(8) A chip-scale Raman sensing probe with sensing region as above with a thin layer of material on the top for coating, anti-stick, and sterilization (autoclave or gamma-ray) purposes.

(9) A chip-scale Raman sensing probe with a thin layer of material on the top of the sensing region as immediately above where the thin layer of material is:
  a. A fluorinated polymer like PTFE or Teflon; or
  b. Aluminum oxide $Al_2O_3$.

(10) A Raman spectroscopy system as above where the sensing probe(s) is (are) integrated in one (e.g., the bioreactor 720 in FIG. 7A) or more bioreactors (e.g., the multi-bioreactor setup in FIG. 7B)

(11) A Raman spectroscopy system as above where the sensing probe(s) is (are) integrated in one or more continuous-flow environments (e.g., the arrangement of Raman sensing systems 600a-600n in FIG. 6C).

(12) A Raman spectroscopy system as above, where there is an additional optical polarization controller (not shown) to control the polarization state of light before it is launched into the optical fibers.

(13) Fibers as above that are polarization-maintaining single-mode fibers.

Example Applications

Examples of the systems and PICs disclosed herein (e.g., with respect to FIGS. 2-7) can include small and inexpensive sensing/Raman spectroscopy devices to be integrated in pharmaceutical production environments. One application can be for small-volume cell-cultures and bioreactors (e.g., see FIGS. 7A-7B) where the chip-integrated sensors can provide real-time, in-situ monitoring of metabolic processes, feed-material depletion, and reaction product formation.

Another application can be flow-integrated, in-line monitoring of active pharmaceutical ingredients in continuous manufacturing environments (e.g., see FIG. 6C).

With respect to pharmaceutical use, generally, the production of critical ingredients for pharmaceuticals is traditionally performed using 'batch-production' methods in large, multiple-use stainless steel vessels. The traditional batch-production methods require labor-intensive cleaning and sterilization of the steel vessels between production runs and stop-and-go processes that bottleneck production speed. Recently, overall trends towards personalized medicine, more potent drugs, and rapidly growing markets for therapeutic proteins (such as antibody-based products) is driving demand for smaller production volumes, increased process flexibility, and faster production times. This has ignited interest from the pharmaceutical industry in two key areas: (1) single-use technologies (SUTs), where tubing, vessels, sensors, etc. are disposable and guaranteed to be sterile prior to use, and (2) continuous-flow manufacturing techniques, where an entire pharmaceutical production line is performed using flow-reactions and without any stops.

Single-use technologies, despite being disposable, have also been shown to have a positive environmental impact, as the cleaning and sterilization process of stainless-steel vessels is environmentally worse than the solid-waste generation from SUTs. Continuous production of pharmaceutical ingredients would dramatically reduce production facility sizes, significantly reduce the amount of time to produce pharmaceutical ingredients (in some cases from months to days), increase process flexibility, increase reliability, and reduce overall waste, process contamination, and environmental impacts. For this reason, there has been a growing interest and trend towards these SUTs for pharmaceutical production, and regulatory bodies such as the US FDA have been strongly encouraging pharmaceutical companies to transition towards continuous manufacturing techniques. However, moving to these technologies alone is not enough to meet the growing demands facing pharmaceutical production environments. It is envisioned that the pharmaceutical facility of the future should have continuous production, 100% single-use equipment, closed processing, and "Ballroom" processing. Closed processing refers to never exposing pharmaceuticals or chemicals to the environment (to prevent contamination and increase yield). "Ballroom" processing refers to having all equipment in one central room rather than multiple facilities (with larger net space).

To realize these breakthrough pharmaceutical production techniques, process analytical technologies (PATs) should find ways of becoming integrated with single-use technologies and continuous-flow environments. Real-time monitoring of reaction progress is encouraged by the US FDA and international organizations as a way of promoting GMP ("Good Manufacturing Practices") and QbD ("Quality by Design") processes. Recently, the rapid progress towards SUTs and continuous manufacturing has generated a large demand for improved sensors beyond what is currently available. For disposable bioreactors and continuous-flow production environments, companies are looking for technologies that can provide real-time information on temperature, pH, dissolved oxygen, cell density, viable cell density nutrients, and metabolite concentrations. A reason for this demand is that current 'gold-standard' analytical techniques involve batch-testing and long sample prep and wait times (such as hours per sample for chromatography methods). Furthermore, existing commercial sensors that can be integrated with single-use technologies include: (1) electrochemical sensors, which have high false-positive rates and relatively poor selectivity, and (2) optical sensors, which are currently single-wavelength sensors with poor selectivity or expensive and relatively large spectroscopic probes. Without better sensing techniques integrated into future bioproduction facilities, it may be difficult to detect abnormal events during production, optimize new processes, or avoid stop-test-and-go situations that are currently prevalent in the industry.

Raman spectroscopy in particular is capable of selectively identifying active pharmaceutical ingredients by probing the unique spectral 'fingerprint' for each molecular structure. Raman spectroscopy is used for in-line and real-time monitoring. Miniaturized, low-cost Raman sensors as disclosed herein can be deployed in both R&D and production environments. The current testing process for one such environment can generally be as follows:

a. A robotic arm (or human) uses a clean syringe to take a small amount of liquid out of each of the 24 bioreactors at a fixed time interval (maybe once every 4-6 hours) and place it in a 96-well (or smaller equivalent) plate. This is because opening the top and introducing a syringe can be a contamination risk.

b. A person or robot moves the plate over to a separate PAT in the lab (often a mass-spectrometer or liquid chromatography tool), and marks or remembers which sample corresponds to which bioreactor.

c. Results are returned in a few hours from a large benchtop tool that measures each sample one-at-a-time.

d. The operator analyzes this data.

e. This information is then used to determine which bioreactors are performing well and which bioreactors need additional feed material, a pH change, etc.

However, by this time it is typically too late to make any changes to the current batch and so the information is used to inform the next set of experiments or cell-cultures. This iterative process influences development worth upwards of $4 M/year for every table-top sized 24-reactor workstation (cell-growth and fermentation is a $30 B/year market). There is hence a need for (1) more information about reactions occurring in their small cell-cultures, (2) selective identification of common molecules like glucose, acetate, and ethanol and small-concentration byproducts, and (3) techniques for obtaining this information that are low-cost and ideally disposable (for sterility).

Raman spectroscopy is capable of selectively identifying active pharmaceutical ingredients by probing the unique spectral 'fingerprint' for each molecular structure. It can be used for in-line and real-time monitoring. Existing Raman spectrometers, however, are unable to meet the demands of process monitoring for SUTs, since the unit cost is prohibitively high (~$30-40 k per portable Raman spectrometer) and a human operator tests each bioreactor one-at-a-time. Integrating a chip-scale Raman sensor such as disclosed herein in each small-volume bioreactor or cell-culture vessel can overcome some of these challenges. Having many small, accurate, and low-cost spectroscopic sensors providing real-time data in parallel would improve automation of the growth process, increase efficiencies (less wasted resources from failed batches), and reduce time-to-development for new pharmaceuticals and drugs.

Likewise, continuous-flow manufacturing of pharmaceuticals is a new technique for quickly and efficiently producing pharmaceuticals that requires new tools and techniques for analysis. In batch-production, samples could be taken to a lab and tested on several highly accurate (albeit high-cost and often slow) instruments. To prevent stops like this in a continuous manufacturing environment, real-time measurement tools can be integrated with flow-tubing and provide sufficient chemical information. In addition, each point in the process that requires monitoring needs its own dedicated measurement tool (rather than one tool in a stop-test-and-go batch environment). To address these needs, future sensors should be low-cost (for monitoring at many points in the process), operated in parallel (to simplify analysis and feedback given large amounts of data), and capable of reliable detection.

Currently, spectrophotometric process analytical tools in the pharmaceutical industry are a $185 M/year market. The systems, PICs, and methods disclosed herein can augment existing spectroscopic analytical tools and can be used in areas where PATs were previously unable to be applied.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic integrated circuit (PIC) for Raman spectroscopy, the PIC comprising:

a semiconductor substrate;
an optical port, integrated with the semiconductor substrate, to receive a Raman pump beam and fluorescence induced by the Raman pump beam from an optical fiber;
a directional coupler, integrated with the semiconductor substrate and having a first port, a second port, a third port, and a fourth port, to receive the Raman pump beam at the first port and to output a first portion of the Raman pump beam at the second port and to output a second portion of the Raman pump beam at the third port;
a first sample waveguide, integrated with the semiconductor substrate and coupled to the second port, to guide the first portion of the Raman pump beam and a first portion of the fluorescence away from the directional coupler, to excite a sample in optical communication with the sample waveguide with the first portion of the Raman pump beam via evanescent coupling, to receive a first scattering signal that is propagating isotropically from the sample in response to the excitation, and to guide a first portion of the first scattering signal to the second port of the directional coupler and to guide a second portion of the first scattering signal away from the directional coupler, the directional coupler coupling part of the first portion of the first scattering signal out of the second port;
a second sample waveguide, integrated with the semiconductor substrate and coupled to the fourth port, to guide the second portion of the Raman pump beam and a second portion of the fluorescence away from the directional coupler, to excite the sample in optical communication with the second sample waveguide with the second portion of the Raman pump beam via evanescent coupling, to receive a second scattering signal that is propagating isotropically from the sample in response to the excitation, and to guide a first portion of the second scattering signal to the third port of the directional coupler and to guide a second portion of the second scattering signal away from the directional coupler, the directional coupler coupling part of the first portion of the second scattering signal out of the third port; and
an output waveguide, integrated with the semiconductor substrate and coupled to the fourth port of the directional coupler, to guide the part of the first scattering signal and the part of the second scattering signal to a detector.

2. The PIC of claim 1, wherein the first sample waveguide and the second sample waveguide are in optical communication with the sample via an external surface of the semiconductor substrate.

3. The PIC of claim 2, wherein at least a portion of the external surface that is in optical communication with the first sample waveguide and the second sample waveguide includes a coating selected to prevent adhesion of the sample to the external surface.

4. The PIC of claim 1, further comprising:
a housing to provide a fluid-tight compartment within;
a sample holding region within the housing in optical communication with the first sample waveguide and the second sample waveguide to hold the sample;
a sample input port formed on the surface of the housing and coupled to the sample holding region to permit inflow of the sample into the sample holding region; and
a sample output port formed on the surface of the housing and coupled to the sample holding region to permit outflow of sample from the sample holding region.

5. The PIC of claim 4, wherein the PIC is a first PIC, and wherein the sample output port of the first PIC is couplable to a sample input port of a second PIC.

6. A system, comprising:
the PIC of claim 1;
an optical unit removably coupled to the PIC, the optical unit including;
a light source coupled to the optical port via the optical fiber, to launch the Raman pump beam into the optical fiber;
the detector coupled to the output waveguide, to receive and detect the scattering signal transmitted by the output waveguide.

7. The system of claim 6, wherein the PIC is a first PIC of a set of PICs coupled to the optical unit, the optical unit further including:
an optical demultiplexer circuit to couple the light source to the optical port of each PIC; and
an optical multiplexer circuit to couple the detector to the output waveguide of each PIC.

8. A bioreactor having the PIC of claim 1 disposed therein.

9. A continuous flow system having the PIC of claim 1 disposed inline with a sample flow.

10. A method of Raman Spectroscopy, comprising:
receiving, at a first port of a directional coupler of a photonic integrated circuit (PIC), from an optical fiber, a Raman pump beam, and fluorescence induced by the Raman pump beam in the optical fiber;
guiding, via a first sample waveguide coupled to a second port of the directional coupler, a first portion of the Raman pump beam and a first portion of the fluorescence away from the directional coupler;
guiding, via a second sample waveguide coupled to a third port of the directional coupler, a second portion of the Raman pump beam and a second portion of the fluorescence away from the directional coupler;
exciting a sample in optical communication with the first sample waveguide with the first portion of the Raman pump beam via evanescent coupling;
exciting the sample in optical communication with the second sample waveguide with the second portion of the Raman pump beam via evanescent coupling;
receiving, via the first sample waveguide, a first scattering signal that is propagating isotropically from the sample in response to exciting via the first sample waveguide and via the second sample waveguide;
receiving, via the second sample waveguide, a second scattering signal that is propagating isotropically from the sample in response to exciting via the first sample waveguide and via the second sample waveguide;
guiding, via the first sample waveguide, a first portion of the first scattering signal to the second port of the directional coupler and guiding a second portion of the first scattering signal away from the directional coupler, the directional coupler coupling part of the first portion of the first scattering signal out of the second port;
guiding, via the second sample waveguide, a first portion of the second scattering signal to the third port of the directional coupler and guiding a second portion of the second scattering signal away from the directional coupler, the directional coupler coupling part of the first portion of the second scattering signal out of the third port;

guiding, via an output waveguide coupled to a fourth port of the directional coupler, the part of the first scattering signal and the part of the second scattering signal to a detector.

11. The method of claim 10, further comprising pumping the sample into a sample holding region in optical communication with the first sample waveguide and the second sample waveguide prior to the exciting with the first sample waveguide and prior to the exciting with the second sample waveguide; and pumping the sample out of the sample holding region after exciting with the first sample waveguide and after the exciting with the second sample waveguide.

12. The PIC of claim 1, wherein the directional coupler has a wavelength selectivity of about 50% to about 99% at a wavelength of the Raman pump beam.

13. The PIC of claim 1, wherein the directional coupler has a wavelength selectivity of about 50% at a wavelength of the Raman pump beam.

14. The PIC of claim 1, wherein the directional coupler has a wavelength sensitivity of about 50% to about 99% at a wavelength of the part of the first scattering signal and the part of the second scattering signal.

15. The PIC of claim 1, wherein the directional coupler has a wavelength sensitivity of at least about 90% at a wavelength of the part of the first scattering signal and the part of the second scattering signal.

16. The PIC of claim 1, wherein the directional coupler, the first sample waveguide, the second sample waveguide, and the output waveguide are configured such that the Raman pump beam is reduced in the detectable part of the first scattering signal and the part of the second scattering signal by up to 65 dB.

* * * * *